US012199335B2

(12) United States Patent
Lim et al.

(10) Patent No.: US 12,199,335 B2
(45) Date of Patent: Jan. 14, 2025

(54) ELECTRONIC DEVICE COMPRISING AN ANTENNA

(71) Applicant: Samsung Electronics Co., Ltd., Suwon-si (KR)

(72) Inventors: Youngjoon Lim, Suwon-si (KR); Haeyeon Kim, Suwon-si (KR); Shinho Yoon, Suwon-si (KR); Soonho Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 117 days.

(21) Appl. No.: 17/994,147

(22) Filed: Nov. 25, 2022

(65) Prior Publication Data

US 2023/0092046 A1 Mar. 23, 2023

Related U.S. Application Data

(63) Continuation of application No. PCT/KR2022/008563, filed on Jun. 16, 2022.

(30) Foreign Application Priority Data

Jun. 16, 2021 (KR) ........................ 10-2021-0078157

(51) Int. Cl.
*H01Q 1/24* (2006.01)
*H01Q 1/42* (2006.01)
(Continued)

(52) U.S. Cl.
CPC ............... *H01Q 1/243* (2013.01); *H01Q 1/24* (2013.01); *H01Q 1/42* (2013.01); *H01Q 1/422* (2013.01); *H01Q 9/0407* (2013.01); *H01Q 21/08* (2013.01)

(58) Field of Classification Search
CPC .......... H01Q 1/243; H01Q 1/24; H01Q 1/422; H01Q 1/42; H01Q 21/08; H01Q 9/0407
See application file for complete search history.

(56) References Cited

U.S. PATENT DOCUMENTS 8,648,752 B2 2/2014 Ramachandran et al.
10,003,679 B2 6/2018 Lee et al.
(Continued)

FOREIGN PATENT DOCUMENTS

CN 208507929 U 2/2019
CN 109546292 A 3/2019
(Continued)

OTHER PUBLICATIONS

European Search Report dated Oct. 8, 2024, issued in European Application No. 22825359.7.

*Primary Examiner* — Hai V Tran
(74) *Attorney, Agent, or Firm* — Jefferson IP Law, LLP

(57) ABSTRACT

An electronic device is provided. The electronic device includes a first frame, a first opening formed in a first area of the first frame, a first antenna module, a cover that includes a first dielectric material and a second dielectric material and is disposed in the first area of the first frame, and a first wireless communication circuit. The first dielectric material includes an engagement groove, and the second dielectric material includes a protrusion corresponding to the engagement groove. The first dielectric material and the second dielectric material may come into contact as the protrusion of the second dielectric material engages with the engagement groove of the first dielectric material.

20 Claims, 20 Drawing Sheets

(51) Int. Cl.

| | |
|---|---|
| ***H01Q 9/04*** | (2006.01) |
| ***H01Q 21/08*** | (2006.01) |

(56) References Cited

U.S. PATENT DOCUMENTS

| | | | | |
|---|---|---|---|---|
| 10,050,681 | B2 | 8/2018 | Kim et al. | |
| 10,141,625 | B1 * | 11/2018 | Ryu | H01Q 1/2291 |
| 10,171,125 | B2 | 1/2019 | Mow et al. | |
| 10,321,590 | B2 | 6/2019 | Cater et al. | |
| 10,455,065 | B2 | 10/2019 | Lee et al. | |
| 10,522,900 | B2 | 12/2019 | Khripkov et al. | |
| 11,228,105 | B2 | 1/2022 | Yun et al. | |
| 11,264,734 | B2 | 3/2022 | Lee et al. | |
| 2009/0278757 | A1 | 11/2009 | Ahn et al. | |
| 2012/0044114 | A1 | 2/2012 | Eom et al. | |
| 2019/0097301 | A1 | 3/2019 | Wu et al. | |
| 2019/0326675 | A1 * | 10/2019 | Kim | H01Q 1/1221 |
| 2020/0144722 | A1 * | 5/2020 | Seo | H01Q 21/08 |
| 2020/0153086 | A1 * | 5/2020 | Park | H01Q 9/0407 |
| 2020/0243948 | A1 * | 7/2020 | Kim | H01Q 5/385 |
| 2020/0329550 | A1 * | 10/2020 | Seo | H01Q 1/02 |
| 2021/0005970 | A1 | 1/2021 | Kimura | |
| 2021/0075115 | A1 | 3/2021 | Kim et al. | |
| 2021/0119338 | A1 | 4/2021 | Avser et al. | |
| 2021/0249751 | A1 * | 8/2021 | Lee | H01Q 1/2283 |
| 2021/0328362 | A1 * | 10/2021 | Park | H01Q 19/027 |
| 2022/0085493 | A1 | 3/2022 | Jia | |

FOREIGN PATENT DOCUMENTS

| | | | |
|---|---|---|---|
| CN | 111146583 | A | 5/2020 |
| CN | 112234361 | A | 1/2021 |
| EP | 3 703 346 | A1 | 9/2020 |
| EP | 3 817 137 | A1 | 5/2021 |
| JP | 2021-010140 | A | 1/2021 |
| KR | 10-1501921 | B1 | 3/2015 |
| KR | 10-2016-0019833 | A | 2/2016 |
| KR | 10-1675002 | B1 | 11/2016 |
| KR | 10-2017-0083949 | A | 7/2017 |
| KR | 10-2018-0113220 | A | 10/2018 |
| KR | 10-2019-0038264 | A | 4/2019 |
| KR | 10-2019-0061795 | A | 6/2019 |
| KR | 10-2109918 | B1 | 5/2020 |
| KR | 10-2020-0061178 | A | 6/2020 |
| KR | 10-2021-0015559 | A | 2/2021 |
| KR | 10-2021-0029363 | A | 3/2021 |

* cited by examiner

ELECTRONIC DEVICE COMPRISING AN ANTENNA

CROSS-REFERENCE TO RELATED APPLICATION(S)

This application is a continuation application, claiming priority under § 365(c), of an International application No. PCT/KR2022/008563, filed on Jun. 16, 2022, which is based on and claims the benefit of a Korean patent application number 10-2021-0078157, filed on Jun. 16, 2021, in the Korean Intellectual Property Office, the disclosure of which is incorporated by reference herein in its entirety.

BACKGROUND

Field

The disclosure relates to an electronic device including an antenna.

Description of Related Art

With the development of communication devices, electronic devices may include an antenna module capable of fast and high-capacity transmission for producing and transmitting various contents, connecting the Internet with various things (e.g., Internet of Things (IoT)), or communication connection between various sensors for autonomous driving. For example, the electronic device may include an antenna module that radiates a millimeter wave (mmWave) signal (hereinafter, referred to as a "mmWave antenna module").

The mmWave antenna module may be disposed adjacent to the outer periphery of a frame forming a side surface of the electronic device. For example, the electronic device may include two mmWave antenna modules disposed adjacent to a side surface of the electronic device to form a beam toward the side surface. As another example, an electronic device may include one mmWave antenna module disposed adjacent to a side surface of the electronic device to form a beam toward the side surface, and one mmWave antenna module disposed adjacent to a rear cover to form a beam toward the rear surface.

The above information is presented as background information only to assist with an understanding of the disclosure. No determination has been made, and no assertion is made, as to whether any of the above might be applicable as prior art with regard to the disclosure.

SUMMARY

Among frame structures of an electronic device, a first frame may configure a first side surface of the electronic device, and the first frame may include an opening provided in a first area in order a first antenna module to radiate a mmWave signal. In this case, in order for a signal having a horizontal polarization characteristic, among mmWave signals radiated by the first antenna module, to pass through the opening, it may be necessary for the height of the opening to be greater than the length of the ½ wavelength of the mmWave signal. However, as electronic devices have recently become thinner, it may be difficult for an electronic device to secure a sufficient height of an opening for the mmWave signal to pass therethrough. For example, it may be difficult for an electronic device to secure sufficient antenna radiation performance in a band of about 24.25 to 27.5 gigahertz (GHz) and/or a band of about 26.5 to 29.5

GHz. In addition, as electronic devices become slimmer, the thickness of an electronic device may decrease and the height of the opening formed on one side surface of the electronic device may decrease. Accordingly, the opening may have a height (vertical width) smaller than a horizontal width thereof. In order to pass through the opening, the length of ½ wavelength of a signal having the characteristic of horizontal polarization should be smaller than the height of the opening. As the height of the opening decreases, the cutoff frequency of a radio frequency (RF) signal that is capable of passing through the opening may increase.

Aspects of the disclosure are to address at least the above-mentioned problems and/or disadvantages and to provide at least the advantages described below. a first dielectric material including an engagement groove and a second dielectric material including a protrusion corresponding to the engagement groove may be disposed in the first area of the first frame.

Additional aspects will be set forth in part in the description which follows and, in part, will be apparent from the description, or may be learned by practice of the presented embodiments.

In accordance with an aspect of the disclosure, an electronic device is provided. The electronic device includes a first frame forming a portion of a first side surface of the electronic device, at least one opening formed in a first area of the first frame, an antenna module that is disposed inside the electronic device to wirelessly radiate a signal toward the at least one opening of the first frame, wherein the antenna module includes a printed circuit board and conductive patches disposed on one surface of the printed circuit board that faces the at least one opening, a cover disposed in the at least one opening of the first frame, wherein the cover includes a first dielectric material forming a first side surface of the electronic device together with the first frame, and including an engagement groove, and a second dielectric material that is disposed between the first dielectric material and the antenna module, and including a protrusion corresponding to the engagement groove of the first dielectric material, wherein the first dielectric material and the second dielectric material come into contact as the protrusion of the second dielectric material is engaged with the engagement groove of the first dielectric material, and a wireless communication circuit electrically connected to the antenna module, wherein the wireless communication circuit is configured to feed power to the conductive patches to transmit and/or receive a signal in a frequency band of 10 GHz or higher.

In accordance with another aspect of the disclosure, an electronic device is provided. The electronic device includes a first frame forming a portion of a first side surface of the electronic device, at least one opening formed in a first area of the first frame, an antenna module disposed inside the electronic device to wirelessly radiate a signal toward the at least one opening of the first frame, a cover that is disposed in the first area of the first frame, wherein the cover includes a first dielectric material forming the first side surface of the electronic device of the electronic device together with the first frame, and including a protrusion, and a second dielectric material that is located between the first dielectric material and the antenna module, and including an engagement groove corresponding to the protrusion of the first dielectric material, wherein the first dielectric material and the second dielectric material are in contact as the protrusion of the first dielectric material is coupled to the engagement groove of the second dielectric material, and a wireless communication circuit electrically connected to the antenna module, wherein the wireless communication circuit is configured to feed power to the conductive patches to transmit and/or receive a signal in a frequency band of 10 gigahertz (GHz) or higher.

According to various embodiments disclosed herein, the electronic device allows an RF signal transmitted and/or received by a wireless communication circuit to pass through a plurality of dielectric materials having different dielectric constants to improve antenna peak gain and antenna coverage.

According to various embodiments of the disclosure, in the electronic device, since the protrusion of the second dielectric material is engaged with the engagement groove of the second dielectric material, it is possible to improve an antenna gain and an antenna coverage in a band of about 24.25 to 27.5 GHz and a band of about 26.5 to 29.5 GHz.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
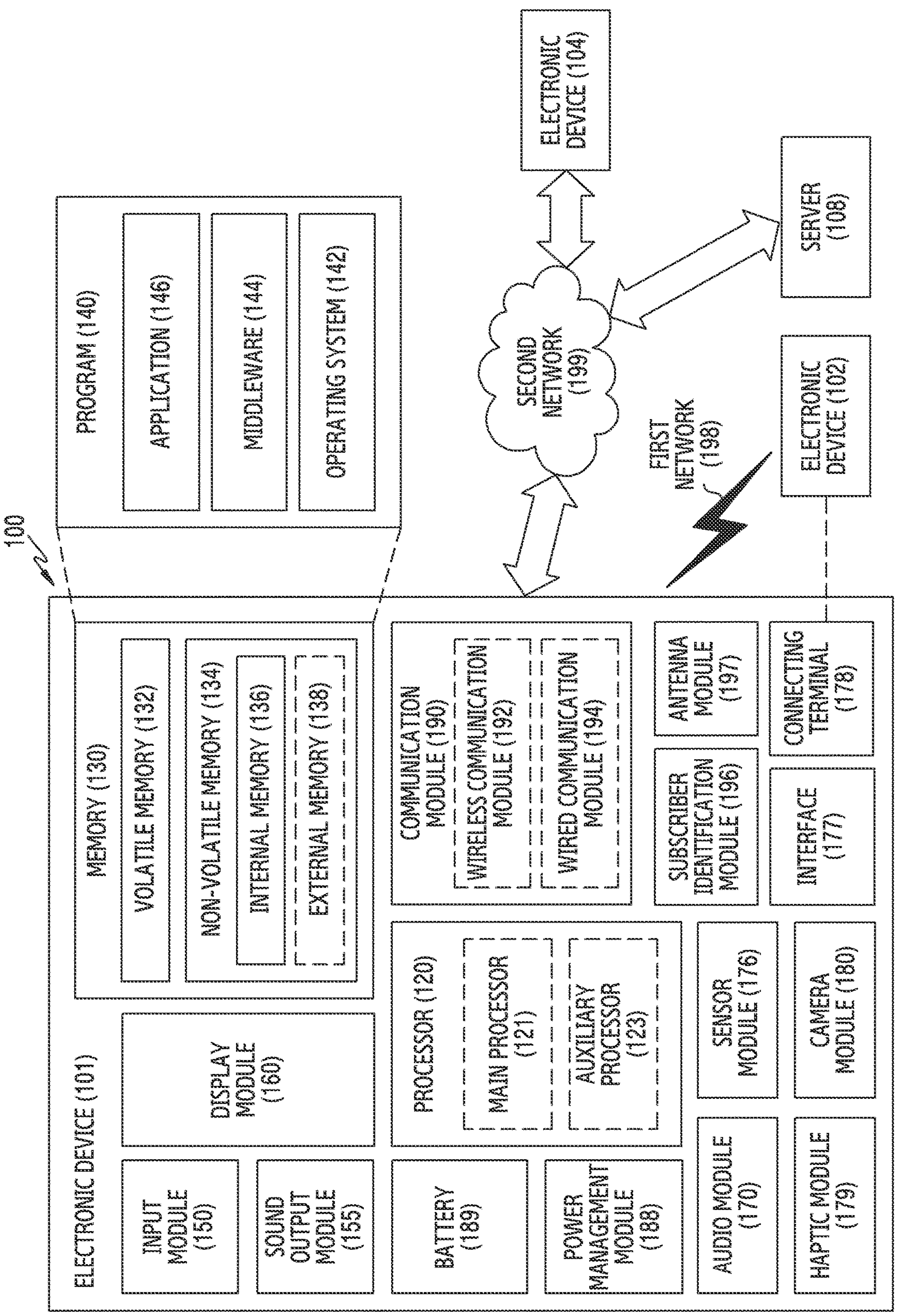
FIG. 1 is a view schematically illustrating an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
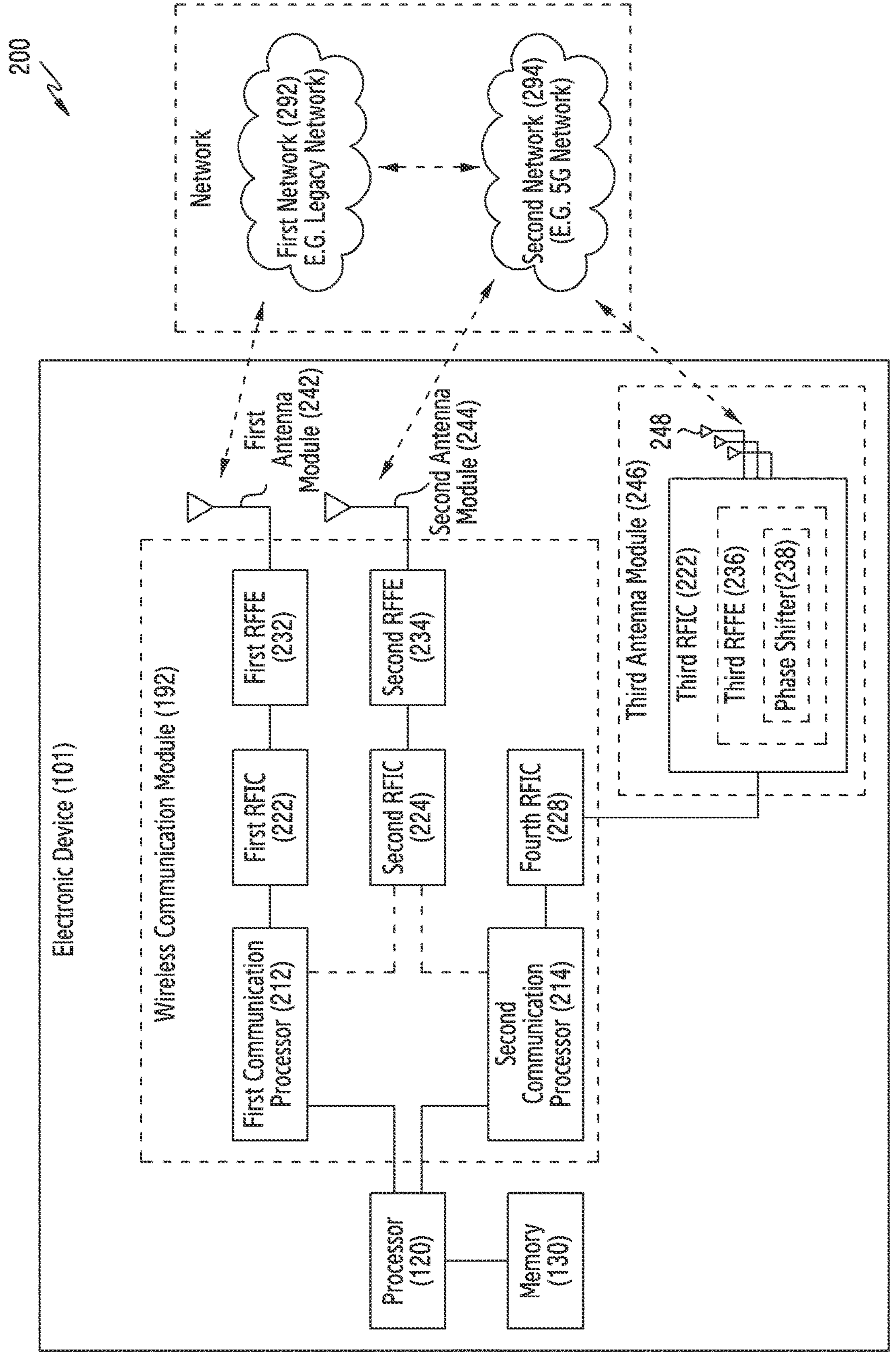
FIG. 2 is a block diagram of an electronic device in a network environment including multiple cellular networks according to an embodiment of the disclosure.

FIG. 2 is a block diagram 200 illustrating an example electronic device 101 in a network environment including a plurality of cellular networks according to an embodiment of the disclosure.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to another embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to another embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel According to various embodiments, the first cellular network may be a legacy network including a 2nd generation (2G), 3rd generation (3G), 4G, or Long-Term Evolution (LTE) network. The second communication processor 214 can support establishment of a communication channel corresponding to a designated band (e.g., about 6 GHz~about 60 GHz) of a band to be used for wireless communication with the second cellular network 294 and 5G network communication through the established communication channel According to various embodiments, the second cellular network 294 may be a 5G network that is defined in 3rd generation partnership project (3GPP). Further, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 converts a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 converts a baseband signal generated by the second communication processor 214 into an RF signal in a 5G Above6 band (e.g., about 6 GHz about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101 may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

The first RFIC 222 and the second RFIC 224 may be implemented as at least a portion of a single chip or a single package. The first RFFE 232 and the second RFFE 234 may be implemented as at least a portion of a single chip or a single package. At least one of the first antenna module 242 or the second antenna module 244 may be omitted, or may be combined with another antenna module and can process RF signals in a plurality of bands.

The third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween.

Accordingly, it is possible to reduce a loss (e.g., attenuation) of a signal in a high-frequency band (e.g., about 6 GHz-~about 60 GHz), for example, which is used for 5G network communication, due to a transmission line. Accordingly, the electronic device 101 can improve the quality and the speed of communication with the second cellular network 294 (e.g., 5G network).

The antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3A:
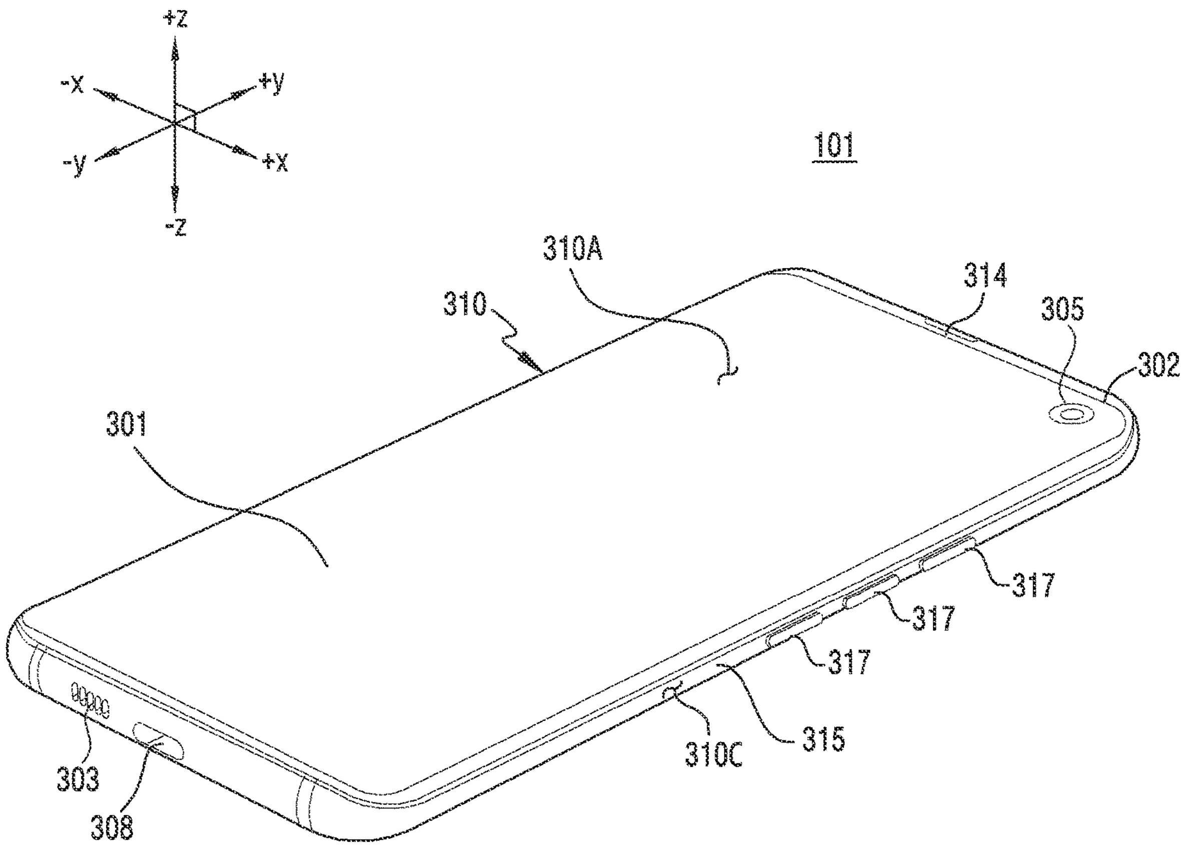
FIG. 3A is a perspective view illustrating an electronic device according to an embodiment of the disclosure.

FIG. 3A is a perspective view illustrating an electronic device according to an embodiment of the disclosure.

Figure 3B:
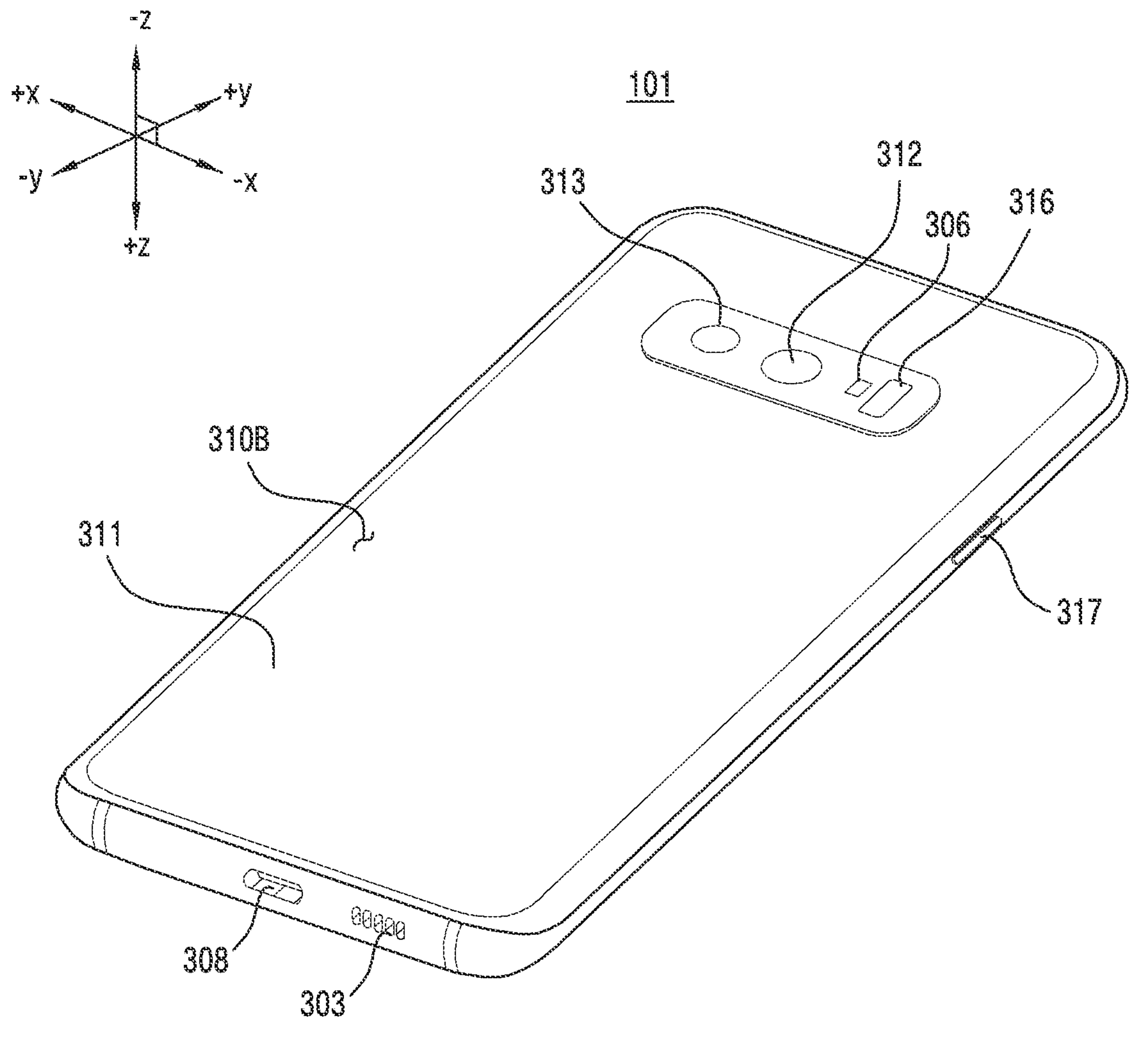
FIG. 3B is a rear perspective view illustrating the electronic device of FIG. 3A according to an embodiment of the disclosure.

FIG. 3B is a rear perspective view illustrating the electronic device of FIG. 3A according to an embodiment of the disclosure.

Referring to FIGS. 3A and 3B, an electronic device 101 according to an embodiment of the disclosure may include a housing 310 including a first surface (or a front surface) 310A, a second surface (or a rear surface) 310B, and a side surface 310C (or a side wall) surrounding the space between the first surface 310A and the second surface 310B. According to another embodiment of the disclosure (not illustrated), the "housing" may refer to a structure forming a part of the first surface 310A, the second surface 310B, and the side surface 310C in FIGS. 3A and 3B.

At least a portion of the first surface 310A of the electronic device 101 may be defined by a substantially transparent front plate 302 (e.g., a glass plate or a polymer plate including various coating layers). The front plate 302 may include a curved portion bent and seamlessly extending from the first surface 310A toward the rear plate 311 in at least one side edge portion.

The second surface 310B may be defined by a substantially opaque rear plate 311. The rear plate 311 may be made of, for example, coated or colored glass, ceramic, polymer, metal (e.g., aluminum, stainless steel (STS), or magnesium), or a combination of two or more of these materials. The rear plate 311 may include a curved portion bent and extending seamlessly from the second surface 310B toward the front plate 302 in at least one side edge portion.

The side surface 310C of the electronic device 101 may be coupled to the front plate 302 and the rear plate 311, and may be configured with a frame structure 315 including metal and/or polymer. In another embodiment, the rear plate 311 and the frame structure 315 may be configured integrally and may include substantially the same material (e.g., a metal material such as aluminum).

The electronic device 101 may include at least one of a display 301, the audio module 170, a sensor module, a first camera module 305, a key input device 317, and a connector hole 308. According to various embodiments of the disclosure, at least one of the components (e.g., the key input device 317) may be omitted, or other components may be additionally included. For example, the electronic device 101 may include a sensor module (not illustrated). In an area provided by the front plate 302, a sensor, such as a proximity sensor or an illuminance sensor, may be integrated into the display 301 or disposed at a position adjacent to the display 301. The electronic device 101 may further include a light-emitting element, and the light-emitting element may be disposed at a position adjacent to the display 301 in the area provided by the front plate 302. The light-emitting element may provide, for example, the state information of the electronic device 101 in an optical form. The light-emitting element may provide, for example, a light source that is interlocked with the operation of the first camera module 305. The light-emitting element may include, for example, a light emitting diode (LED), an IR LED, and/or a xenon lamp.

The display 301 may be exposed through a substantial portion of, for example, the front plate 302. The edges of the display 301 may be provided to be substantially the same as the outer peripheral shape (e.g., a curved surface) of the front plate 302 adjacent thereto. The distance between the outer periphery of the display 301 and the outer periphery of the front plate 302 may be substantially constant in order to enlarge the exposed area of the display 301. A recess or an opening may be provided in a portion of a screen display area of the display 3A, and other electronic components aligned with the recess or the opening, such as the first camera module 305, a proximity sensor (not illustrated), or an illuminance sensor (not illustrated), may be included.

The rear surface of the screen display area of the display 301 may include at least one of a second camera module 312, a third camera module 313, a fingerprint sensor 316, and a flash 306. In another embodiment, the display 301 may be coupled to or disposed adjacent to a touch-sensitive circuit, a pressure sensor capable of measuring a touch intensity (pressure), and/or a digitizer configured to detect a magnetic field-type stylus pen.

The audio module 170 may include a microphone hole and/or a speaker hole. The microphone hole may include a microphone disposed therein so as to acquire external sound. According to an embodiment of the disclosure, multiple microphones may be disposed in the microphone hole so as to detect the direction of sound. The speaker hole and the microphone hole may be implemented as a single hole 303, or a speaker (e.g., a piezo speaker) may be included without a speaker hole. The speaker hole may include an external speaker hole and a call receiver hole 314.

By including a sensor module (not illustrated), the electronic device 101 may generate an electrical signal or a data value corresponding to an internal operating state of the electronic device 101 or an external environmental condition. The sensor module may further include, for example, a proximity sensor disposed on the first surface 310A of the housing 310, a fingerprint sensor incorporated in or disposed adjacent to the display 301, and/or a biometric sensor (e.g., an HRM sensor) disposed on the second surface 310B of the housing 310. The electronic device 101 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The electronic device 101 may include a second camera module 312, a third camera module 313, and/or a flash 306 disposed on the second surface 310B. The first camera module 305, the second camera module 312, and/or the third camera module 313 may include one or more lenses, an image sensor, and/or an image signal processor. The electronic device 101 may include a flash 306. The flash 306 may include, for example, a light-emitting diode or a xenon lamp. Two or more lenses (e.g., an infrared camera lens, a wide-angle lens, and a telephoto lens) and image sensors may be disposed on one surface of the electronic device 101.

The key input devices 317 may be arranged on the side surface 310C of the housing 310. According to various embodiments of the disclosure, the electronic device 101 may omit some or all of the above-mentioned key input devices 317, and a key input device 317, which is not included in the electronic device 101, may be implemented in another form, such as a soft key, on the display 301. The key input devices may include at least a portion of a fingerprint sensor 316 disposed on the second surface 310B of the housing 310.

The connector hole 308 may accommodate a connector configured to transmit and receive power and/or data to and from an external electronic device, and/or a connector configured to transmit and receive an audio signal to and from an external electronic device. For example, the connector hole 308 may include a USB connector or an earphone jack.

Figure 4A:
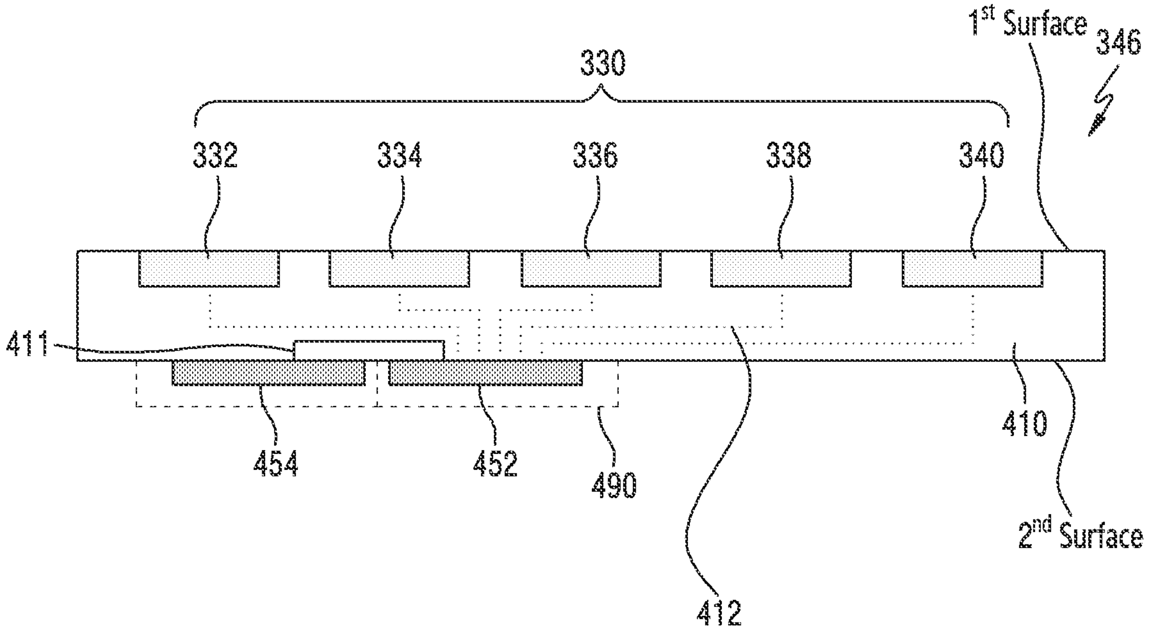
FIG. 4A is a cross-sectional view illustrating a first antenna module according to an embodiment of the disclosure.

FIG. 4A is a cross-sectional view illustrating a first antenna module according to an embodiment of the disclosure.

Referring to FIG. 4A, the first antenna module 346 may include a first printed circuit board 410, first conductive patches 330, a first wireless communication circuit 452, and/or a power management integrated circuit (PMIC) 454. According to an embodiment of the disclosure, the first antenna module 346 may further include a shielding member 490 (e.g., a shield can).

The first printed circuit board 410 may include multiple conductive layers and multiple non-conductive layers stacked alternately with the conductive layers. The first printed circuit board 410 may provide electrical connection between various electronic components disposed on the first printed circuit board 410 by using wires and conductive vias provided in the conductive layers. For example, the first wireless communication circuit 452 may be electrically connected to the PMIC 454 via a first wire 411 of the first printed circuit board 410. As another example, the first wireless communication circuit 452 may be electrically connected to the first conductive patches 330 via second wires 412 of the first printed circuit board 410.

The first antenna module 346 may include first conductive patches 330. For example, the first antenna module 346 may include a first conductive patch 332, a second conductive patch 334, a third conductive patch 336, a fourth conductive patch 338, and/or a fifth conductive patch 340. The first conductive patches 330 may operate as antenna elements for forming a directional beam. According to an embodiment of the disclosure, the first conductive patches 330 may be provided on a first surface of the first printed circuit board 410 as illustrated in FIG. 4A. In another embodiment, the first conductive patches 330 may be provided inside the first printed circuit board 410. The first antenna module 346 may further include a plurality of antenna arrays which are the same as or different from each other in shape or type (e.g., dipole antenna arrays, and/or additional patch antenna arrays) in addition to the first conductive patches 330.

The first wireless communication circuit 452 may be disposed on a second surface opposite to the first surface of the first printed circuit board 410. The first wireless communication circuit 452 may be configured to process an RF signal of a predetermined frequency band (e.g., a frequency band of 10 GHz or higher) transmitted and/or received via the first conductive patches 330. The first wireless communication circuit 452 may convert a baseband signal obtained from the processor 120 to an RF signal of a predetermined frequency band in order to transmit the RF signal of the predetermined frequency band. The first wireless communication circuit 452 may convert an RF signal of the predetermined frequency band received via the first conductive patches 330 into a baseband signal and provide the baseband signal to the processor 120.

An RF signal transmitted and/or received in a frequency band of about 10 GHz or higher may have a polarization characteristic. For example, a first RF signal of the frequency band of about 10 GHz or more may have a vertical polarization characteristic, and a second RF signal of the frequency band of about 10 GHz or more may have a horizontal polarization characteristic. Accordingly, the electronic device 101 may transmit various types of information to an external device by using the first RF signal and/or the second RF signal having different polarization characteristics.

The first wireless communication circuit 452 may up-convert an IF signal (e.g., about 9 GHz to about 11 GHz) obtained from an intermediate frequency integrated circuit (IFIC) into an RF signal of a selected band in order to transmit the RF signal. In addition, the first wireless communication circuit 452 may down-convert an RF signal obtained via the first conductive patches 330 into an IF signal to transmit the IF signal to the IFIC.

The PMIC 454 may be disposed on the second surface of the first printed circuit board 410. The PMIC 454 may provide power required for various electronic components (e.g., the first wireless communication circuit 452) of the first antenna module 346.

The shielding member 490 may be disposed on the second surface of the first printed circuit board 410 to electromagnetically shield at least one of the first wireless communication circuit 452 or the PMIC 454. For example, the shielding member 490 may be disposed on the second surface of the first printed circuit board 410 to cover the first wireless communication circuit 452 and/or the PMIC 454. The shielding member 490 may include an encapsulant such as an epoxy molding compound (EMC) or a shield can, but is not limited thereto.

Although the first antenna module 346 illustrated in FIG. 4A is illustrated as including first conductive patches 330 configuring a 1×5 antenna array, the disclosure is not limited thereto, and the first antenna module 346 may include various numbers and arrangement structures of conductive patches. For example, the first antenna module 346 may include a first conductive patch 332 and a second conductive patch 334, wherein the first conductive patch 332 and the second conductive patch 334 may configure a 1×2 antenna array. As another example, the first antenna module 346 may include a first conductive patch 332, a second conductive patch 334, a third conductive patch 336, and a fourth conductive patch 338, wherein the first conductive patch 332, the second conductive patch 334, the third conductive patch 336, and the fourth conductive patch 338 may configure a 1×4 antenna array. Hereinafter, FIG. 4B illustrates an antenna module according to another embodiment including conductive patches forming a 1×4 antenna array.

Figure 4B:
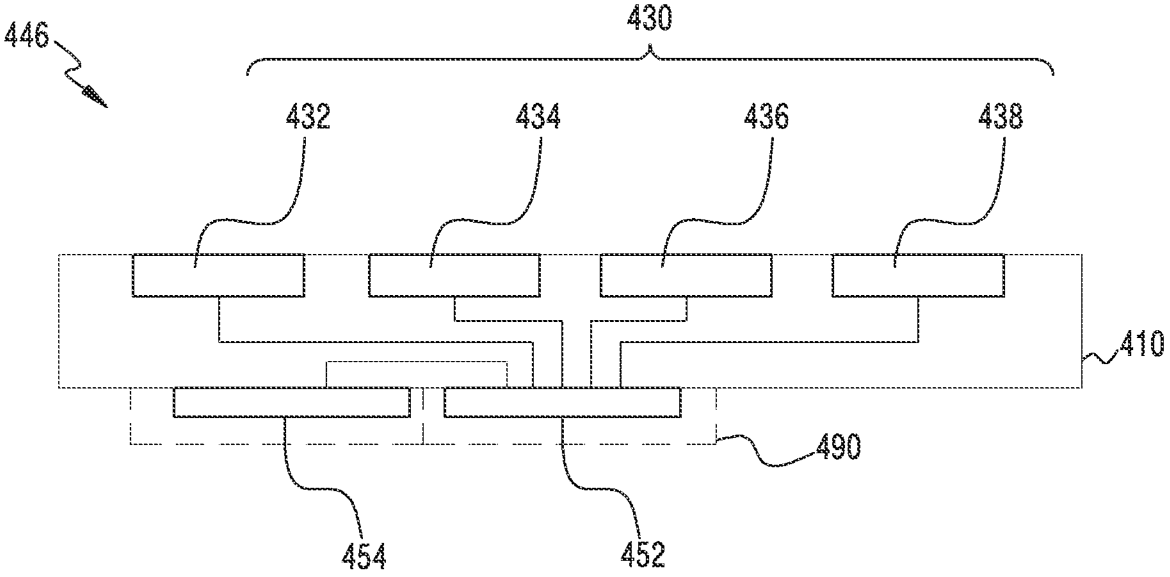
FIG. 4B is a view illustrating a first antenna module according to an embodiment of the disclosure.

FIG. 4B is a view illustrating a first antenna module according to an embodiment of the disclosure.

Referring to FIG. 4B, the first antenna module 446 may include a plurality of conductive patches 430. For example, the first antenna module 446 may include a first conductive patch 432, a second conductive patch 434, a third conductive patch 336, and/or a fourth conductive patch 438. In an embodiment, the first conductive patch 432, the second conductive patch 434, the third conductive patch 436, and the fourth conductive patch 438 may configure a 1×4 antenna array.

Figure 5A:
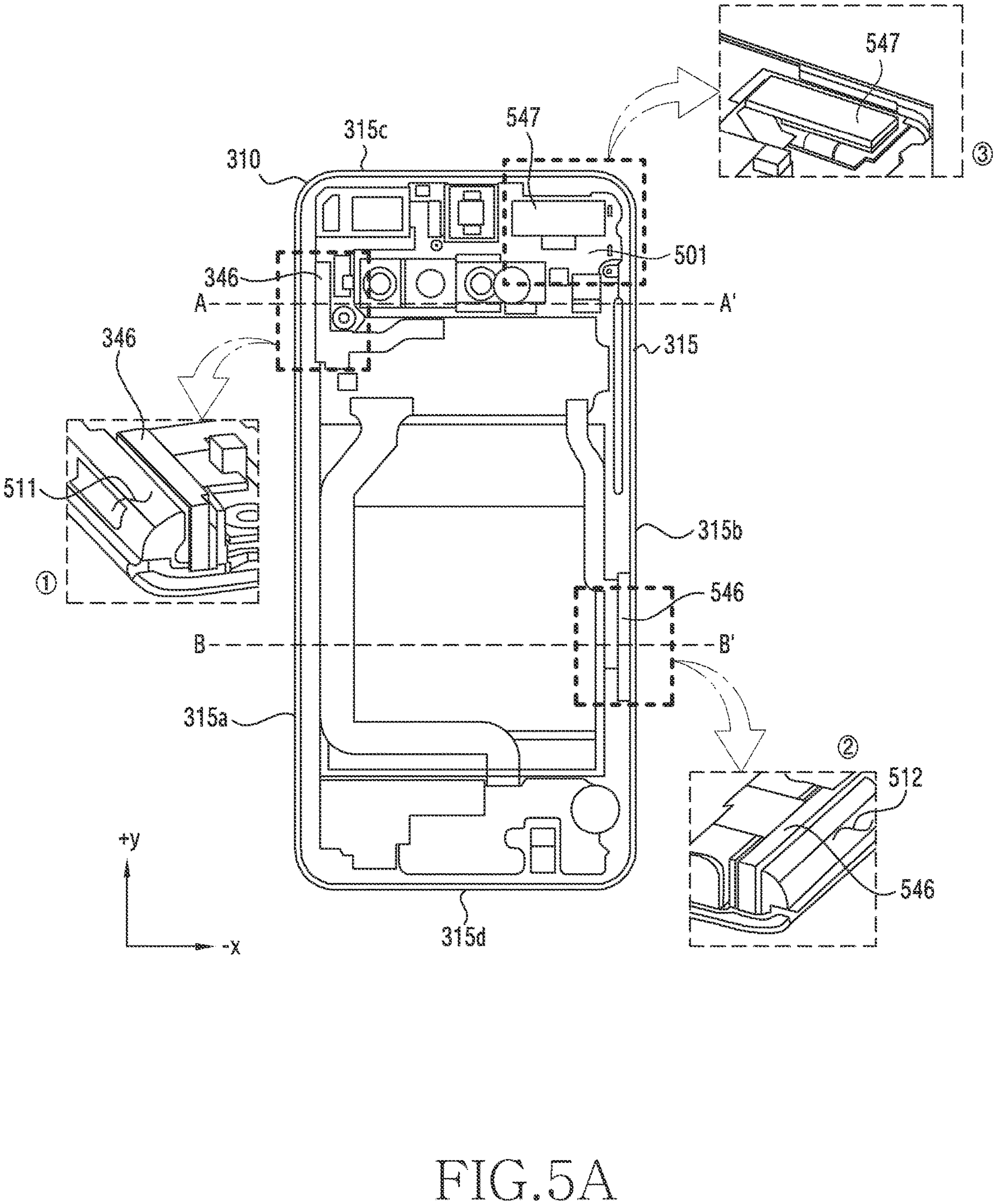
FIG. 5A is a view provided for illustrating positions of antenna modules disposed inside an electronic device according to an embodiment of the disclosure.

FIG. 5A is a view provided for describing positions of antenna modules disposed inside an electronic device according to an embodiment of the disclosure.

Referring to FIG. 5A, the electronic device 101 may include a first antenna module 346, a second antenna module 546, and/or a third antenna module 547. The second antenna module 546 and the third antenna module 547 may include substantially the same components as the first antenna module 346 illustrated in FIG. 4A (e.g., a printed circuit board, conductive patches, a radio communication circuit). A detailed description of the second antenna module 546 will be described later with reference to FIG. 7.

The first antenna module 346 and/or the second antenna module 546 may be disposed adjacent to the frame structure 315. For example, the frame structure 315 may include a first frame 315*a*, a second frame 315*b*, a third frame 315*c*, and a fourth frame 315*d*. The first antenna module 346 may be disposed adjacent to the first frame 315*a* forming the first side surface 511 of the electronic device 101. The second antenna module 546 may be disposed adjacent to the second frame 315*b* forming the second side surface 512 of the electronic device 101.

The first antenna module 346 may be disposed to form a directional beam toward the first side surface 511 in order to secure a space for mounting an electronic component (e.g., a battery) of the electronic device 101 and to secure antenna radiation performance. The second antenna module 546 may be disposed to form a directional beam toward the second side surface 512. However, the position and structure in which the first antenna module 346 and/or the second antenna module 546 are arranged are not limited to the position and structure illustrated in FIG. 5A, and the first antenna module 346 and/the second antenna module 546 may be disposed in various positions in the electronic device 101 with various arrangement structures.

The third antenna module 547 may be disposed to be substantially parallel to the main printed circuit board 501 disposed in the electronic device 101. For example, the third antenna module 547 may be disposed to form a directional beam toward the rear surface 310B of the electronic device 101. The location and structure of the electronic device 101 in which the third antenna module 547 illustrated in FIG. 5A is disposed are only an example, and the disclosure is not limited thereto.

Figure 5B:
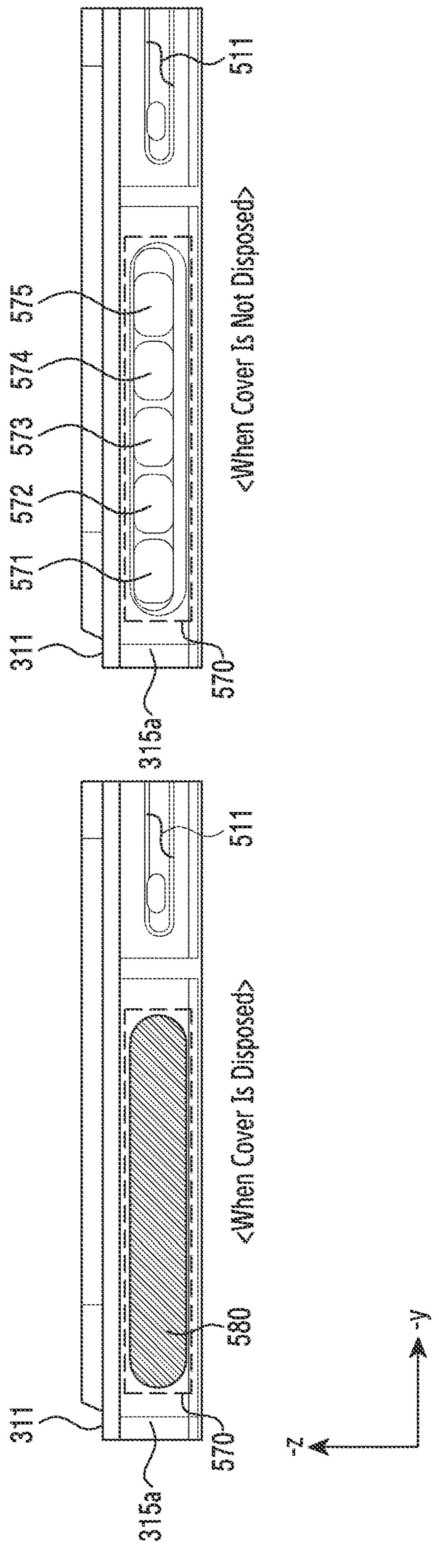
FIG. 5B is a view illustrating a first frame to which the first antenna module is disposed adjacent and an opening area provided in the first frame according to an embodiment of the disclosure.

FIG. 5B is a view illustrating a first frame to which the first antenna module is disposed adjacent and an opening area provided in the first frame according to an embodiment of the disclosure.

Referring to FIG. 5B, the first frame 315*a* may include a first opening area 570 in one area. A cover 580 may be disposed in the first opening area 570. When the first opening area 570 is viewed from the exterior of the electronic device 101, the first opening 571, the second opening 572, the third opening 573, the fourth opening 574, and/or the fifth opening 575 provided in the opening area 570 may be covered by the cover 580. The cover 580 may be formed of dielectric materials having different dielectric constants, which will be described later with reference to FIG. 5C.

Since the cover 580 including a dielectric material having a high dielectric constant is disposed in the first opening area 570, the electronic device 101 may secure antenna radiation performance. For example, as the electronic device 101 becomes slimmer, the thickness of the electronic device 101 may decrease and the height of the first opening 571 provided in the first side surface 511 of the electronic device 101 may decrease. Accordingly, the height (the vertical width) of the first opening 571 may be narrower than the horizontal width. In order to pass through the first opening 571, the length of the ½ wavelength of the signal having a horizontal polarization the characteristic should be smaller than the height of the first opening 571. As the height of the first opening 571 decreases, the cut-off frequency of an RF signal that is capable of passing through the opening 571 may be increased. However, even if the physical height of the first opening 571 is not increased, the electronic device 101 may lower the cut-off frequency by disposing a dielectric material having a high dielectric constant in the first opening 571. For example, when a dielectric material having a dielectric constant of about 10 is disposed in the opening, the minimum height of the opening for allowing an RF signal of a band of about 24.25 to 27.5 GHz (e.g., n258) to pass therethrough may be about 2 mm, and when a dielectric material having a dielectric constant of about 6 is disposed in the opening, the minimum height of the opening for allowing an RF signal of a band of about 24.25 to 27.5 GHz (e.g., n258) to pass therethrough may be about 2.6 mm. Accordingly, it is possible to ensure an antenna performance in the electronic device 101 by lowering the cutoff frequency of the RF signal passing through the opening by disposing a dielectric material of a relatively high dielectric constant in the first opening 571. The description of the first opening 571 is substantially equally applicable to the second opening 572, the third opening 573, the fourth opening 574, and/or the fifth opening 575.

The cover 580 may be disposed in the first opening area 570 to form the first side surface 511 of the electronic device 101 together with the first frame 315*a*. In an embodiment, the first opening area 570 may have a rectangular shape, but is not limited thereto. The first opening area 570 may have various shapes.

An RF signal transmitted and/or received as the first wireless communication circuit 452 feeds power to the first conductive patches 330 may pass through the first opening area 570 and the cover the cover 580 disposed in the first opening area 570.

Figure 5C:
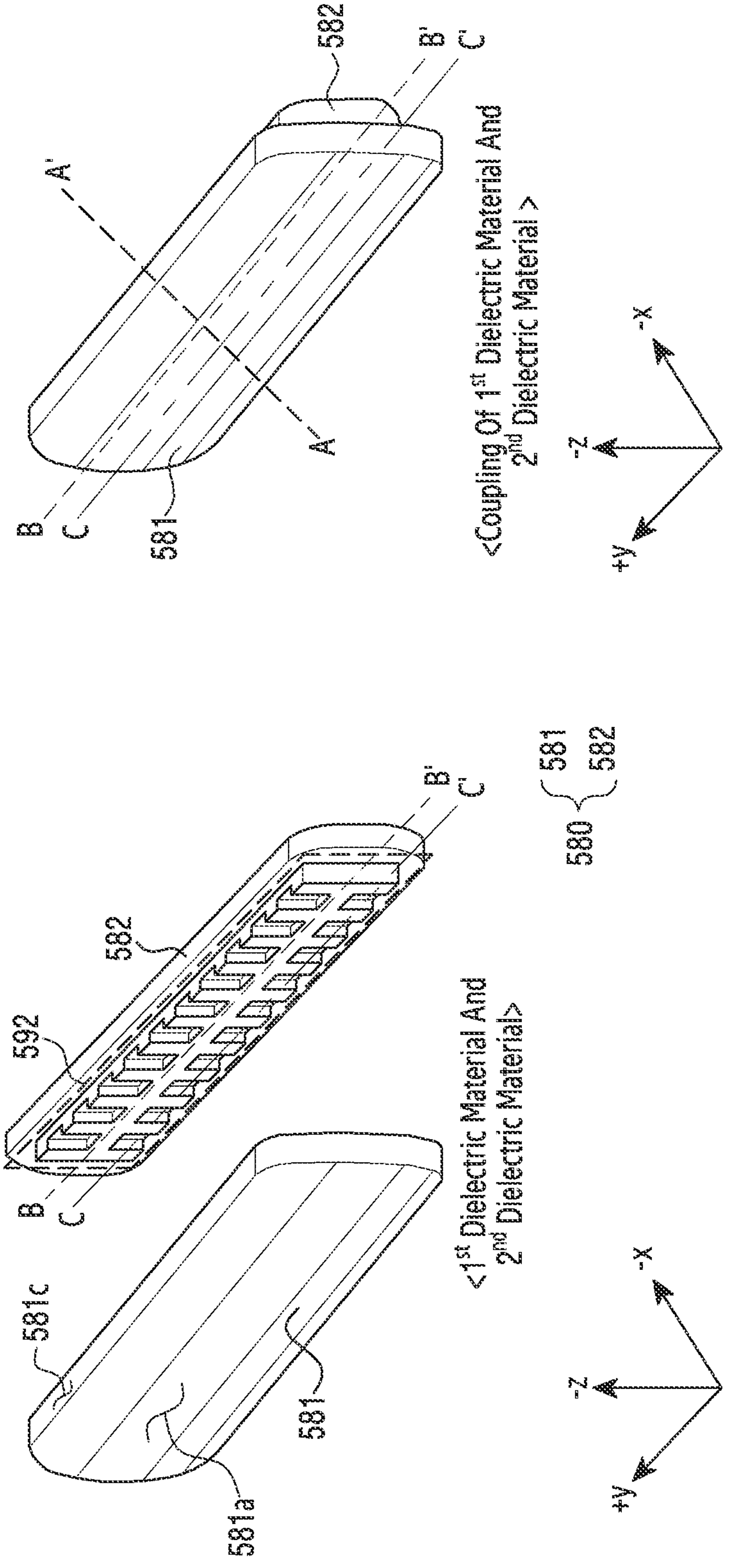
FIG. 5C is a view illustrating a cover including a first dielectric material and a second dielectric material according to an embodiment of the disclosure.

FIG. 5C is a view illustrating a cover including a first dielectric material and a second dielectric material according to an embodiment of the disclosure.

Figure 5D:
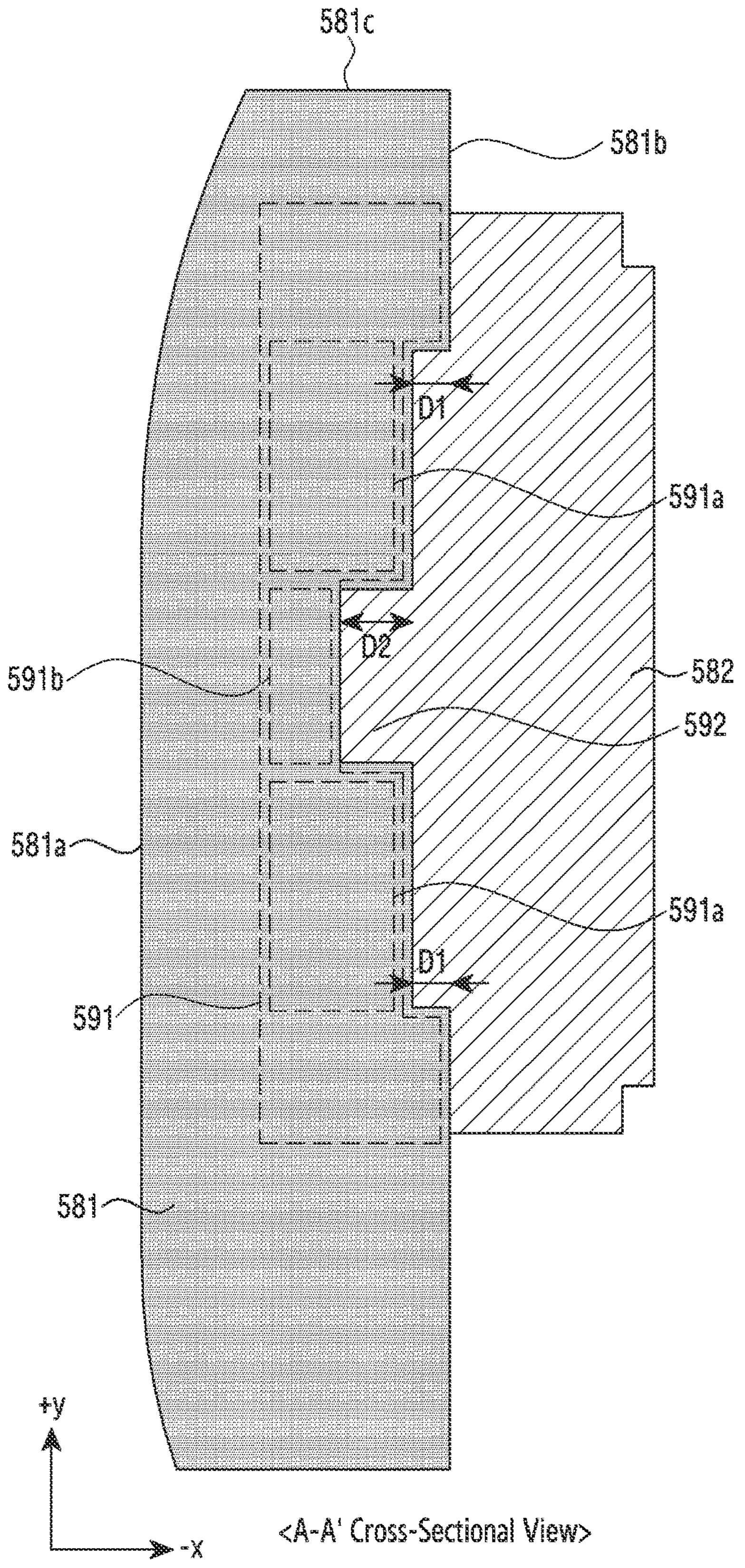
FIG. 5D is a view illustrating A-A' cross-sectional view of the cover illustrated in FIG. 5C according to an embodiment of the disclosure.

FIG. 5D is a view illustrating A-A' cross-sectional view of the cover illustrated in FIG. 5C according to an embodiment of the disclosure.

Referring to FIGS. 5C and 5D, the cover 580 may include a first dielectric material 581 and a second dielectric material 582. The first dielectric constant of the first dielectric material 581 according to an embodiment may be lower than the second dielectric constant of the second dielectric material 582. The first dielectric material 581 may include an engagement groove 591, and the second dielectric material 582 may include a protrusion 592 corresponding to the engagement groove 591.

The first dielectric material 581 may include a first surface 581*a* facing the exterior of the electronic device 101, a second surface 581*b* that is in contact with the second dielectric material 582 in at least one area, and a third surface 581*c* between the first surface 581*a* and the second surface 581*b*. In an embodiment, at least one area of the first surface 581*a* of the first dielectric material 581 may be formed as a curved surface.

The engagement groove 591 of the first dielectric material 581 may be formed as a stair shape. For example, the engagement groove 591 of the first dielectric material 581 may include a first portion 591*a* having a first depth D1 and a second portion 591*b* having a second depth D2. In an embodiment, the stair shape may mean a shape having a predetermined level difference (e.g., a first depth D1 and a second depth D2).

The shape of the protrusion 592 of the second dielectric material 582 may be provided to correspond to the engagement groove 591 of the first dielectric material 581. As the protrusion 592 of the second dielectric material 582 engage with the engagement groove 591 of the first dielectric material, the first dielectric material 581 and the second dielectric material 582 may come into contact with each other.

According to an embodiment of the disclosure, an adhesive member may be disposed between the first dielectric material 581 and the second dielectric material 582, and the first dielectric material 581 and the second dielectric material 582 may be bonded to each other. According to another embodiment of the disclosure, the first dielectric material 581 and/or the second dielectric material 582 may be bonded without a separate adhesive member. For example, the second surface 581*b* of the first dielectric material 581 may be configured as an adhesive layer having an adhesive force, and the first dielectric material 581 and the second dielectric material 582 may be bonded to each other.

As the protrusion 592 is inserted (or entered in) into the engagement groove 591, the second dielectric material 582 may be bonded to the first dielectric material 581 along the shape of the engagement groove 591 of the first dielectric material 581. For example, the engagement groove 591 may have a stair shape, and the second dielectric material 582 may be bonded to the first dielectric material 581 along the stair-shaped engagement groove 591.

Figure 5E:
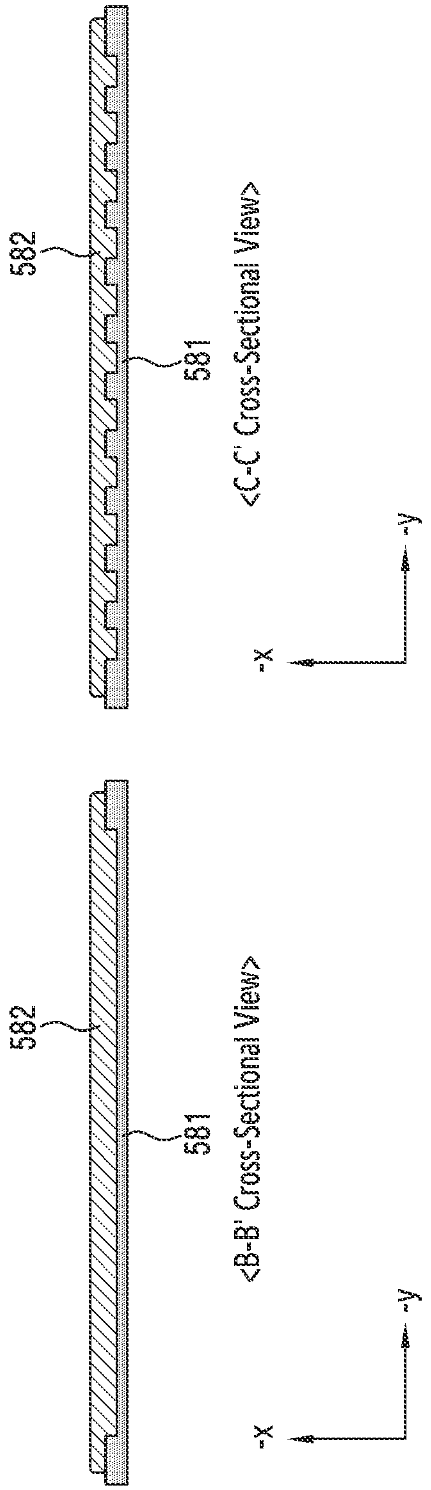
FIG. 5E is a view illustrating B-B' cross-sectional view and C-C' cross-sectional view of the cover illustrated in FIG. 5C according to an embodiment of the disclosure.

FIG. 5E is a view illustrating a cross-sectional view of the cover taken along line B-B' in FIG. 5C and a cross-sectional view taken along line C-C' in FIG. 5C according to an embodiment of the disclosure.

Referring to FIG. 5E, the drawing illustrates the cross-sectional view taken along line B-B' and the cross-sectional view taken along line C-C' in the case in which the first dielectric material 581 and the second dielectric material 582 are bonded to each other as the protrusion 592 of the second dielectric material 582 is engaged with the engagement groove 591 of the first dielectric material 581 according to an embodiment.

Figure 6A:
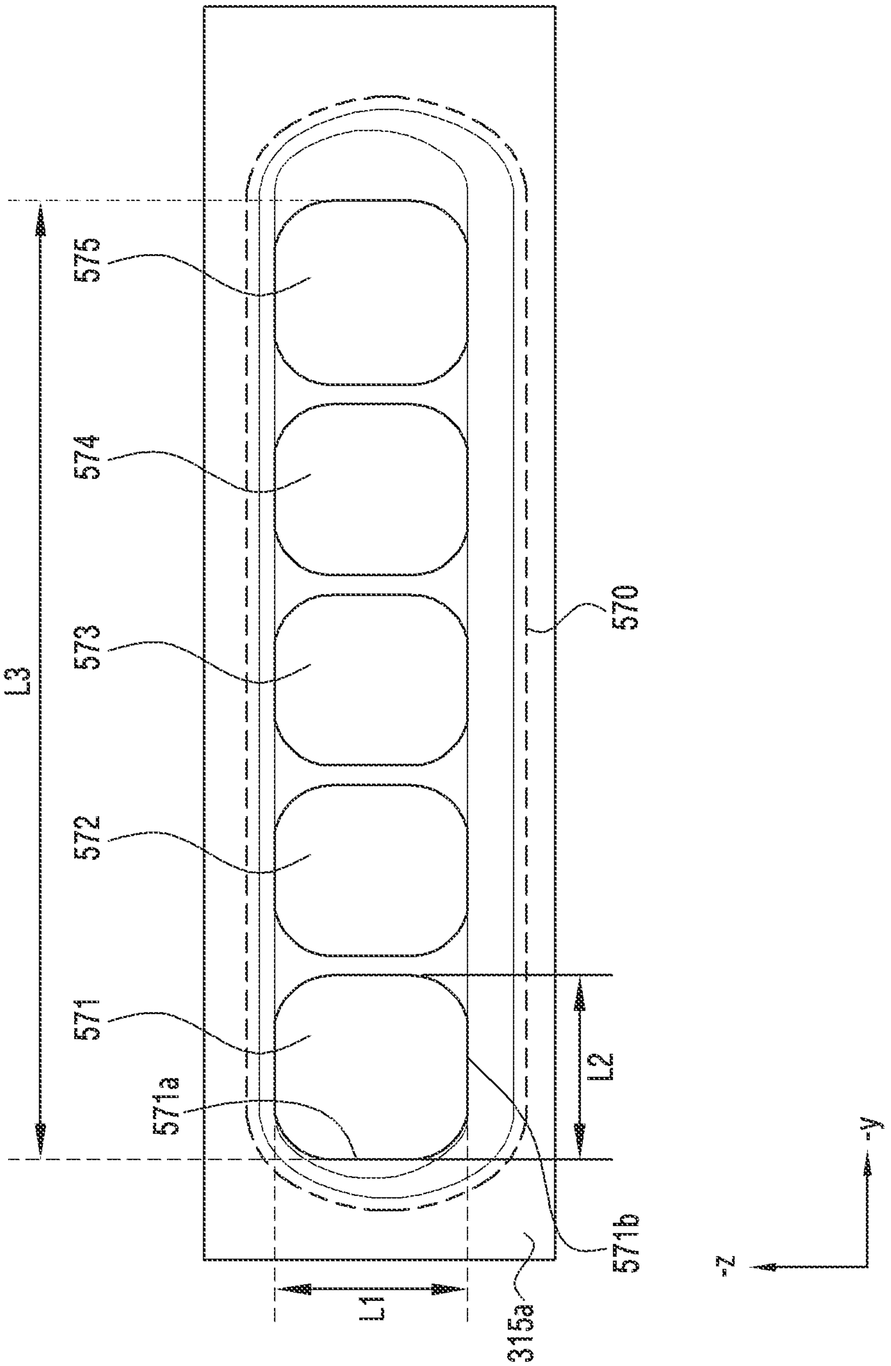
FIG. 6A is a view illustrating an opening area provided in a first frame from which a dielectric material is removed according to an embodiment of the disclosure.

FIG. 6A is a view illustrating an opening area provided in a first frame from which a dielectric material is removed according to an embodiment of the disclosure.

Referring to FIG. 6A, the first opening area 570 provided in the first frame 315*a* according to an embodiment may include a first opening 571, a second opening 572, a third opening 573, a fourth opening area 574 and/or a fifth opening 575. The plurality of openings 571, 572, 573, 574, and 575 may correspond respectively to the first conductive patches 330 of the first antenna module 346. The plurality of openings 571, 572, 573, 574, and 575 may have a predetermined height and a predetermined width. For example, the first opening 571 may include a first edge 571*a*, and the first edge 571*a* corresponding to the height of the first opening 571 may have a first length L1. In an example, the first opening 571 may include a second edge 571*b* substantially perpendicular to the first edge 571*a*, and the second edge 571*b* corresponding to the width of the first opening 571 may have a second length L2.

In the embodiment illustrated in FIG. 6A, the first opening area 570 is illustrated as including the first opening 571, the second opening 572, the third opening 573, the fourth opening 574, and/or the fifth opening 575. However, the number and sizes of openings are not limited thereto.

The plurality of openings 571, 572, 573, 574, and 575 may be in one-to-one correspondence with the first conductive patches 330 of the first antenna module 346. For example, the first opening 571 may correspond to the first conductive patch 332, the second opening 572 may correspond to the second conductive patch 334, the third opening 573 may correspond to the third conductive patch 336, the fourth opening 574 may correspond to the fourth conductive patch 338, and the fifth opening 575 may correspond to the fifth conductive patch 340. For example, when the first opening area 570 is viewed from the exterior of the electronic device 101, the first opening 571 may overlap the first conductive patch 332.

Figure 6B:
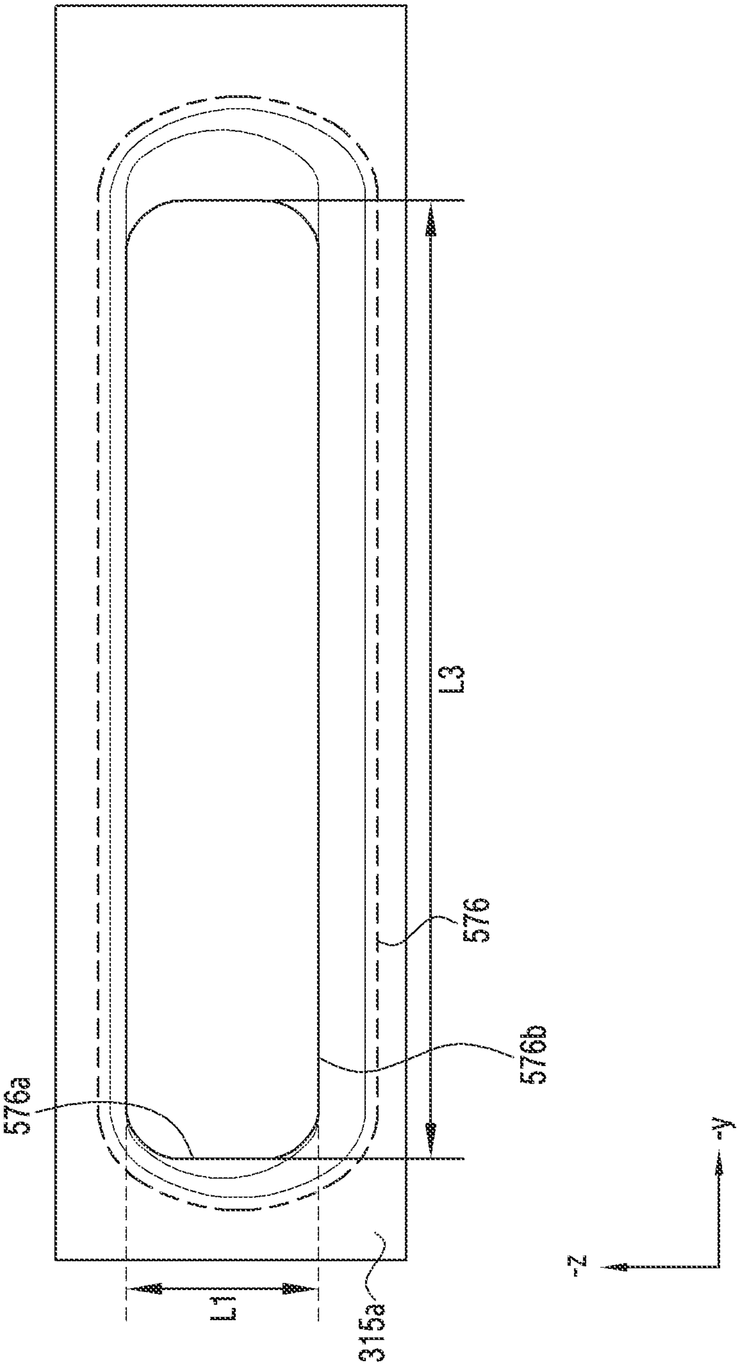
FIG. 6B is a diagram illustrating an opening area provided in a first frame from which a dielectric material is removed according to an embodiment of the disclosure.

FIG. 6B is a view illustrating an opening area which is provided in a first frame and from which a dielectric material is removed according to an embodiment of the disclosure.

Referring to FIG. 6B, a first opening area 576 may be provided in an area of the first frame 315*a*. The first opening area 576 may be provided with a single opening differently from the first opening area 570 that includes a plurality of openings 571, 572, 573, 574, and 575 in FIG. 6A. According to an embodiment of the disclosure, the first opening area 570 may have a rectangular shape, but the shape of the first opening area 570 is not limited thereto and may have various shapes.

The first opening area 576 may have a predetermined height and a predetermined width. For example, the first opening 576 may include a first edge 576*a*, wherein the first edge 576*a*, which corresponds to the height of the first opening 576, may have a first length L1. The first opening 576 may include a second edge 576*b* substantially perpendicular to the first edge 576*a*, wherein the second edge 576*b*, which corresponds to the width of the first opening 576, may have a third length L3. The third length L3 may be longer than the first length L1. For example, the third length L3 may be determined such that, when the first opening area 570 is viewed from the exterior of the electronic device 101, the first opening 571 and the first conductive patches 330 overlap each other.

Figure 7:
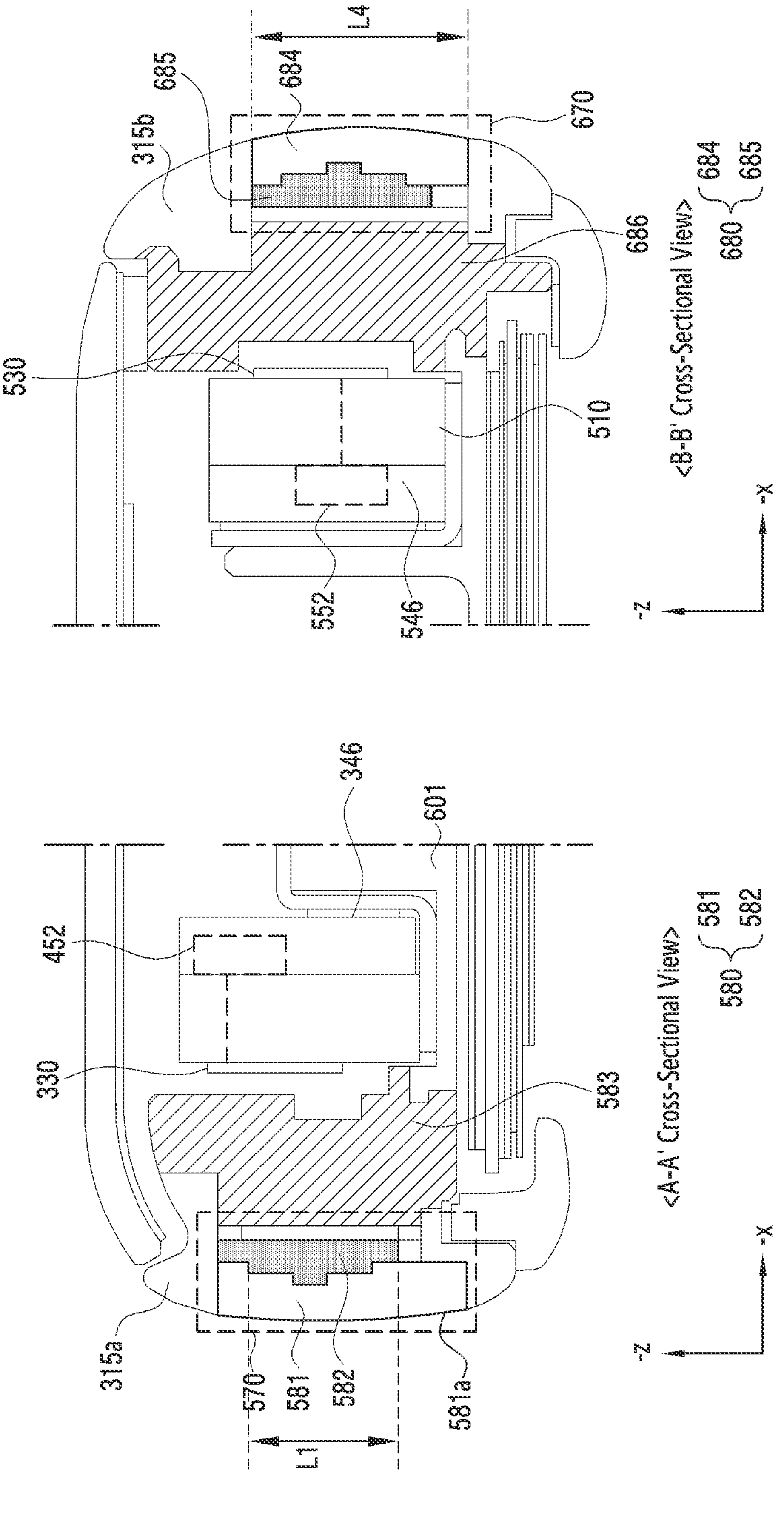
FIG. 7 is a view illustrating a cover disposed in an opening area according to an embodiment of the disclosure.

FIG. 7 is a view illustrating a cover disposed in an opening area according to an embodiment of the disclosure.

Referring to FIG. 7, an A-A' cross-sectional view and a B-B' cross-sectional view of the electronic device 101 of FIG. 5A are illustrated.

The electronic device 101 may include a support member 601. The support member 601 may support the first antenna module 346 such that the first antenna module 346 is able to form a directional beam toward the first frame 315*a*.

The cover 580 may include a first dielectric material 581 and a second dielectric material 582. The first dielectric material 581 may be disposed in the first opening area 570 and form the first side surface 511 of the electronic device 101 together with the first frame 315*a*. The first dielectric material 581 may be disposed in the first opening area 570 and form the first side surface 511 of the electronic device 101 together with the first frame 315*a*.

The second dielectric material 582 may be disposed between the first dielectric material 581 and the first antenna module 346. The second dielectric material 582 may be coupled to the first dielectric material 581.

The first dielectric material 581 may have a lower dielectric constant than the second dielectric material 582. For example, the first dielectric constant of the first dielectric material 581 may have an appropriate value between about 2 and 4, and the second dielectric constant of the second dielectric material 582 may have an appropriate value between about 5.5 and 12.

The electronic device 101 may include a third dielectric material 583. The third dielectric material 583 may be disposed between the cover 580 and the first antenna module 346. For example, the third dielectric material 583 may be disposed in a first direction (e.g., the −x direction) with respect to the cover 580.

The third dielectric constant of the third dielectric material 583 may be substantially the same as the first dielectric constant of the first dielectric material 581, but is not limited thereto. The third dielectric constant of the second dielectric material 582 may be different from the first dielectric constant of the first dielectric material 581 in a range in which the third dielectric constant is lower than the second dielectric constant of the second dielectric material 582.

According to another embodiment of the disclosure, the electronic device 101 may include only the first dielectric material 581 and the second dielectric material 582 disposed in the first opening area 570, without including the third dielectric material 583 disposed between the second dielectric material 582 and the first antenna module 346.

An RF signal transmitted and/or received as the first wireless communication circuit 452 feeds power to the first conductive patches 330 may pass through the first dielectric material 581, the second dielectric material 582, and the third dielectric material 583. As the transmitted and/or received RF signal passes through the first dielectric material 581, the second dielectric material 582, and the third dielectric material 583, the electronic device 101 may secure a higher antenna gain and wider antenna coverage compared to the case in which the RF signal passes through a single dielectric material 581 having a dielectric constant lower than or equal to the first dielectric constant.

For example, the RF signal transmitted and/or received by the electronic device 101 may have a first polarization characteristic in a first direction or a second polarization characteristic in a second direction orthogonal to the first direction. The first direction may mean, for example, a direction parallel to the first edge 571*a* of the first opening 571 of FIG. 6A (e.g., the z-axis direction), and the second direction may mean a direction parallel to the second edge 571*b* of the first opening 571 (e.g., the y-axis direction). Hereinafter, it is assumed that the first polarization characteristic in the first direction is a horizontal polarization characteristic and the second polarization characteristic in the second direction is a vertical polarization characteristic.

In order for the RF signal to be transmitted to and/or received from the exterior of the electronic device 101 by the first antenna module 346, it may be necessary for the first length L1, which is the height of the plurality of openings 571, 572, 573, 574, and 575 provided in the first frame 315*a*, to be greater than the ½ wavelength of the first signal (λ/2) of the RF signal that has a horizontal polarization characteristic.

In addition, it may be necessary for the second length L2, which is the width of the plurality of openings 571, 572, 573, 574, and 575 provided in the first frame 315*a*, to be greater than the ½ wavelength of the second signal of the RF signal that has a vertical polarization characteristic. However, when the first dielectric material 581 and the second dielectric material 582 are disposed in the first opening area 570 and the third dielectric material 583 is disposed between the first opening area 570 and the first antenna module 346, the RF signal may pass through the plurality of openings 571, 572, 573, 574, and 575 even when the length of the ½ wavelength of the RF signal (λ/2) is smaller than the first length L1, which is the height of the plurality of openings 571, 572, 573, 574, and 575, or smaller than the second length L2, which is the width of the plurality of openings. Accordingly, by disposing the first dielectric material 581, the second dielectric material 582, and the third dielectric material 583 in the first opening area 570 and between the first opening area 570 and the first antenna module 346 in the electronic device 101, it may be possible to reduce the size of the first opening 570 and to secure a predetermined antenna performance compared to the case in which a single dielectric material is disposed.

As at least a portion of the second dielectric material 582 is inserted into and bonded to the first dielectric material 581, it may be possible for the electronic device 101 to secure a relatively high antenna performance in a predetermined frequency band compared to the case in which the second dielectric material is bonded to the first dielectric material without being inserted into the first dielectric material. The predetermined frequency band may include about 24.25 to 27.5 GHz and/or about 26.5 to 29.5 GHz. As another example, since at least one area of the first surface 581*a* of the first dielectric material 581 is formed as a curved surface, the electronic device 101 may secure a higher antenna performance compared to the case in which the first surface of the first dielectric material 581 is formed only as a flat surface.

For example, the propagation path of the RF signal passing through the first dielectric material 581 and the second dielectric material 582 may vary depending on the shape in which the first dielectric material 581 and the second dielectric material 582 are bonded to each other, and the shapes of the first dielectric material 581 and the second dielectric material 582 themselves. Accordingly, as at least a portion of the second dielectric material 582 is inserted into the first dielectric material 581, and at least one area of the first surface 581*a* of the first dielectric material 581 is formed as a curved surface, the electronic device 101 may be improved in the radiation performance of an RF signal of a predetermined frequency band.

Table 1 is a table showing, in comparison, antenna gains in the band of about 24.25 to 27.5 GHz in a case in which different dielectric materials are bonded to each other without insertion and the first surface of the first dielectric material is formed as a flat surface only, and a case in which at least a portion of the second dielectric material 582 is inserted into and bonded to the first dielectric material 581 and at least an area of the first surface 581*a* of the first dielectric material 581 is formed as a curved surface.

TABLE 1

| | When different dielectric materials are bonded to each other without being inserted and first surface is formed as flat surface only (dB) | When second dielectric material is inserted into and bonded to first dielectric material, and at least one area of first surface is formed as a curved surface (dB) |
|---|---|---|
| Max. (Peak Gain) | 13.1 | 13.1 |
| 50% (CDF) | 3.2 | 4.0 |

Referring to Table 1, in the band of about 24.25 to 27.5 GHz, in the case in which at least a portion of the second dielectric material 582 is inserted into and bonded to the first dielectric material 581, and the case in which different dielectric materials are bonded to each other without insertion, when the cumulative probability is 50% of the maximum in a cumulative distribution function, the antenna gains are 4.0 dB and 3.2 dB, respectively, in that order. Accordingly, when at least a portion of the second dielectric material 582 is inserted into and bonded to the first dielectric material 581, the electronic device 101 may secure an antenna gain difference of about 0.8 dB compared to the case in which the second dielectric material 582 is bonded without insertion.

Table 2 is a table showing, in comparison, antenna gains in the band of about 26.5 to 29.5 GHz in a case in which different dielectric materials are bonded to each other without insertion and the first surface of the first dielectric material is formed as a flat surface only, and a case in which at least a portion of the second dielectric material 582 is inserted into and bonded to the first dielectric material 581 and at least an area of the first surface 581*a* of the first dielectric material 581 is formed as a curved surface.

TABLE 2

| | When different dielectric materials are bonded to each other without being inserted and first surface is formed as flat surface only (dB) | When second dielectric material is inserted into and bonded to first dielectric material, and at least one area of first surface is formed as a curved surface (dB) |
|---|---|---|
| Max. (Peak Gain) | 13.1 | 13.1 |
| 50% (CDF) | 5.6 | 6.0 |

Referring to Table 2, in the band of about 26.5 to 29.5 GHz, in the case in which at least a portion of the second dielectric material 582 is inserted into and bonded to the first dielectric material 581, and the case in which different dielectric materials are bonded to each other without insertion, when the cumulative probability is 50% of the maximum in a cumulative distribution function, the antenna gains are 6.0 dB and 5.6 dB, respectively, in that order. Accordingly, when at least a portion of the second dielectric material 582 is inserted into and bonded to the first dielectric material 581, the electronic device 101 may secure an antenna gain difference of about 0.4 dB compared to the case in which the second dielectric material 582 is bonded without insertion.

The second antenna module 546 may include a second printed circuit board 510, second conductive patches 530 disposed on a first surface of the second printed circuit board 510 and/or a second wireless communication circuit 552 disposed on a second surface of the second printed circuit board 510. The second wireless communication circuit 552 may transmit and/or receive an RF signal of a predetermined frequency band (e.g., the band of about 10 GHz or higher) by feeding power to the second conductive patches 530.

The second frame 315*b* may include a second opening area 670 in one area thereof. Although not illustrated in FIG. 7, the second opening area 670 may include a plurality of openings, similar to the first opening area 570. The plurality of openings may correspond respectively to the second conductive patches 530 of the second antenna module 546. While the plurality of openings 571, 572, 573, 574, and 575 of the first opening area 570 have a height of the first length L1, the plurality of openings of the second opening area 670 may have a height of a fourth length L4.

The electronic device 101 may include a second cover 680 disposed in the second opening area 670, and the second cover 680 may include a fourth dielectric material 684 and a fifth dielectric material 685. In an embodiment, the fifth dielectric material 685 may be coupled to the fourth dielectric material 684.

The description of the first dielectric material 581 and the second dielectric material 582 may be applicable to the fourth dielectric material 684 and the fifth dielectric material 685. For example, the fourth dielectric material 684 of the second cover 680 may correspond to the first dielectric material 581 of the cover 580, and the fifth dielectric material 685 of the second cover 680 may correspond to the second dielectric material 582 of the cover 580.

The sixth dielectric material 686 may be disposed between the second cover 680 and the second antenna module 546. For example, the sixth dielectric material 686 may be disposed in a first direction (e.g., the −x direction) with respect to the second antenna module 546.

The fourth dielectric material 684 may have a lower dielectric constant than the fifth dielectric material 685. For example, the fourth dielectric constant of the fourth dielectric material 684 may have an appropriate value between about 2 and 4, and the fifth dielectric constant of the fifth dielectric material 685 may have an appropriate value between about 5.5 and 12. The sixth dielectric constant of the sixth dielectric material 686 may be substantially the same as the fourth dielectric constant of the fourth dielectric material 684, but is not limited thereto. The sixth dielectric constant may be different from the fourth dielectric constant of the fourth dielectric material 684 in a range in which the sixth dielectric constant is lower than the fifth dielectric constant of the fifth dielectric material 685.

An RF signal transmitted and/or received as the second wireless communication circuit 552 feeds power to the second conductive patches 530 may pass through the fourth dielectric material 684, the fifth dielectric material 685, and the sixth dielectric material 686. As the transmitted and/or received RF signal passes through the fourth dielectric material 684, the fifth dielectric material 685, and the sixth dielectric material 686, the electronic device 101 may secure a higher antenna gain and wider antenna coverage compared to the case in which the RF signal passes through a single dielectric material.

According to an embodiment, as the fifth dielectric material 685 is inserted into and bonded to the fourth dielectric material 684 in the second cover 680, the electronic device 101 may secure a relatively high antenna gain in a predetermined frequency band (e.g., 24.25 to 27.5 GHz) compared to the case in which different dielectric materials are bonded to each other in flat surfaces. In addition, as at least one area of one surface of the fourth dielectric material 684 of the second cover 680 is formed as a curved surface, in the electronic device 101, it may be possible to reduce the size of the second opening area 670 and to secure a predetermined performance compared to the case in which one surface of the fourth dielectric material is formed as a flat surface only.

Figure 8:
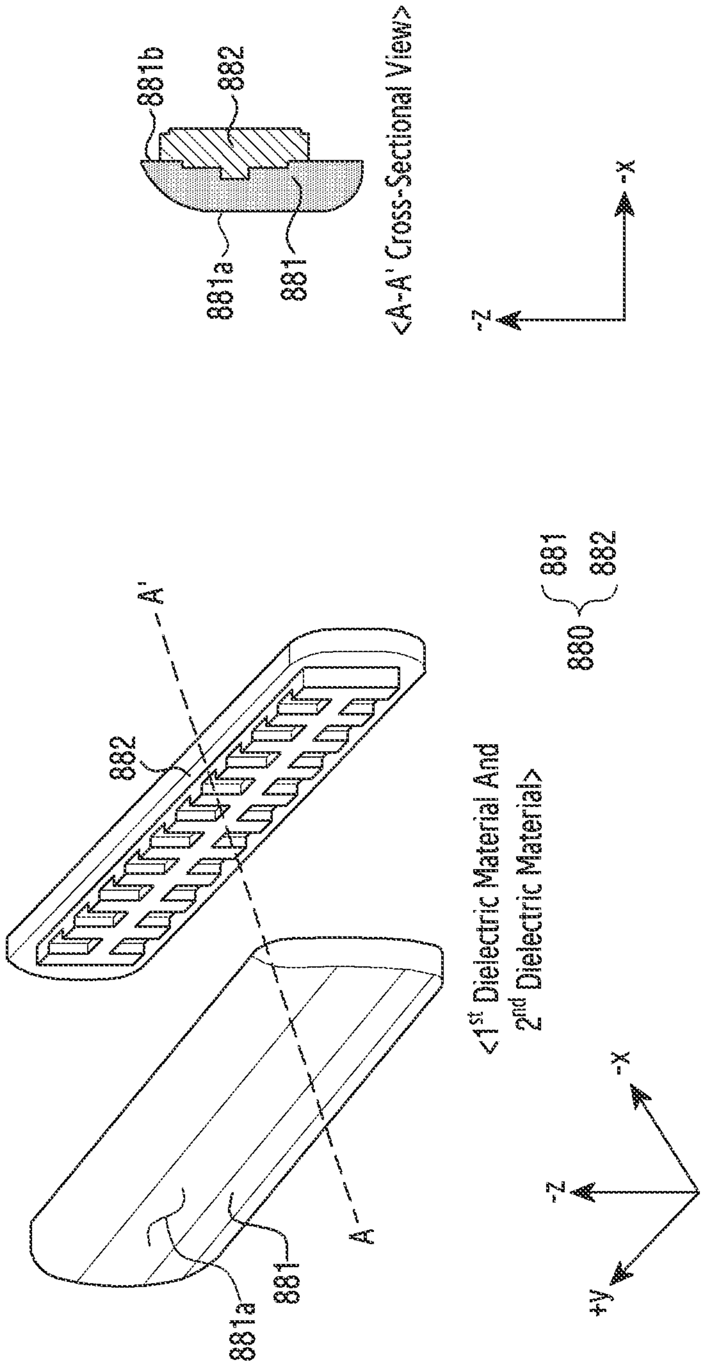
FIG. 8 is a view illustrating a perspective view and a cross-sectional view of a cover according to an embodiment of the disclosure.

FIG. 8 is a view illustrating a perspective view and a cross-sectional view of a cover according to an embodiment of the disclosure.

FIG. 8 illustrates a first dielectric material 881 having a shape that is different from that of the first dielectric material 581 illustrated in FIG. 5D.

Referring to FIG. 8, the cover 880 may include a first dielectric material 881 and a second dielectric material 882. The first dielectric material 881 may be disposed in the first opening area 570 and form the first side surface 511 of the electronic device 101 together with the first frame 315*a*. The first dielectric material 881 may include a first surface 881*a* in which at least one area is formed as a curved surface and a second surface 881*b* that is in contact with the second dielectric material 882 in at least one area. The first surface 881*a* and the second surface 881*b* of the first dielectric material 881 may be in contact with each other at one edge of the first dielectric material 881. Accordingly, the first dielectric material 881 may omit a third surface between the first surface 881*a* and the second surface 881*b*, unlike the first dielectric material 581 of FIG. 5D including the third surface 581*c*.

As a result, since the first dielectric material 881 omits the third surface, the first dielectric material 881 may include a wider curved surface in the first surface 881*a* compared to the first dielectric material 581 illustrated in FIG. 5D.

As at least a portion of the second dielectric material 882 is inserted into and bonded to the first dielectric material 881, the electronic device 101 may be relatively improved in antenna performance in a predetermined frequency band compared to the case in which the second dielectric material is bonded to the first dielectric material without being inserted into the first dielectric material. The predetermined frequency band may include about 24.25 to 27.5 GHz and/or about 26.5 to 29.5 GHz.

Since at least one area of the first surface 881*a* of the first dielectric material 881 is formed as a curved surface, the electronic device 101 may secure a higher antenna gain compared to the case in which the first surface of the first dielectric material is formed only as a flat surface.

Table 3 is a table showing, in comparison, antenna gains in the band of about 24.25 to 27.5 GHz in a case in which different dielectric materials are bonded to each other without insertion and the first surface of the first dielectric material is formed as a flat surface only, and a case in which at least a portion of the second dielectric material 882 is inserted into and bonded to the first dielectric material 881 and at least an area of the first surface 881*a* of the first dielectric material 881 is formed as a curved surface.

TABLE 3

| | When different dielectric materials are bonded to each other without being inserted and first surface is formed as flat surface only (dB) | When second dielectric material is inserted into and bonded to first dielectric material, and at least one area of first surface is formed as a curved surface (dB) |
|---|---|---|
| Max. (Peak Gain) | 13.1 | 13.1 |
| 50% (CDF) | 3.1 | 4.0 |

Referring to Table 3, in the band of 24.25 to 27.5 GHz, in the case in which at least a portion of the second dielectric material 882 according to an embodiment is inserted into and bonded to the first dielectric material 881, and the case in which different dielectric materials are bonded to each other without insertion, when the cumulative probability is 50% of the maximum in a cumulative distribution function, the antenna gains are 4.0 dB and 3.1 dB, respectively, in that order. Accordingly, when at least a portion of the second dielectric material 882 is inserted into and bonded to the first dielectric material 881, the electronic device 101 may secure an antenna gain difference of about 0.9 dB compared to the case in which the second dielectric material 582 is bonded without insertion.

Table 4 is a table showing, in comparison, antenna gains in the band of about 26.5 to 29.5 GHz in a case in which different dielectric materials are bonded to each other without insertion and the first surface of the first dielectric material is formed as a flat surface only, and a case in which at least a portion of the second dielectric material 882 is inserted into and bonded to the first dielectric material 881 and at least an area of the first surface 881*a* of the first dielectric material 881 is formed as a curved surface.

TABLE 4

| | When different dielectric materials are bonded to each other without being inserted and first surface is formed as flat surface only (dB) | When second dielectric material is inserted into and bonded to first dielectric material, and at least one area of first surface is formed as a curved surface (dB) |
|---|---|---|
| Max. (Peak Gain) | 13.1 | 13.1 |
| 50% (CDF) | 5.6 | 5.9 |

Referring to Table 4, in the band of about 26.5 to 29.5 GHz, in the case in which at least a portion of the second dielectric material 882 according to an embodiment is inserted into and bonded to the first dielectric material 881, and the case in which different dielectric materials are bonded to each other without insertion, when the cumulative probability is 50% of the maximum in a cumulative distribution function, the antenna gains are 5.9 dB and 5.6 dB, respectively, in that order. Accordingly, when at least a portion of the second dielectric material 882 is inserted into and bonded to the first dielectric material 881, the electronic device 101 may secure an antenna gain difference of about 0.3 dB compared to the case in which the second dielectric material 882 is bonded without insertion.

Figure 9:
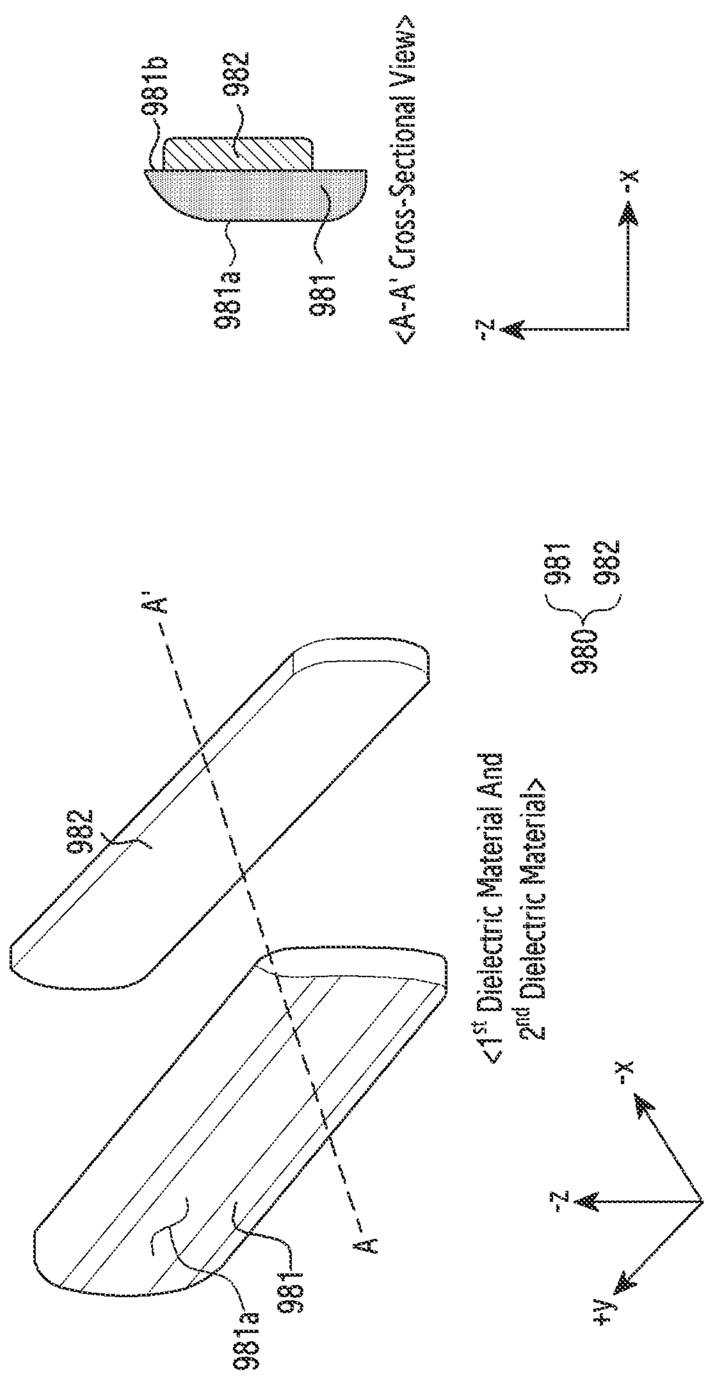
FIG. 9 is a view illustrating a perspective view and a cross-sectional view of a cover according to an embodiment of the disclosure.

FIG. 9 is a view illustrating a perspective view and a cross-sectional view of a cover according to an embodiment of the disclosure.

Referring to FIG. 9, the cover 980 may include a first dielectric material 981 and a second dielectric material 982. The first dielectric material 981 may be disposed in the first opening area 570 and form the first side surface 511 of the electronic device 101 together with the first frame 315*a*. The second dielectric material 982 may be bonded to the first dielectric material 981 without being inserted into the first dielectric material 981. However, even in this case, the first dielectric material 981 may include one surface in which at least one area is formed as a curved surface. For example, the first dielectric material 981 may include a first surface 981*a* including at least one area formed as a curved surface and a second surface 981*b* bonded to the second dielectric material 982.

Since at least one area of the first surface 981*a* of the first dielectric material 981 is formed as a curved surface, the electronic device 101 may secure a relatively higher antenna performance compared to the case in which the first surface of the first dielectric material is formed only as a flat surface. Accordingly, in the electronic device 101, even when the second dielectric material 982 is bonded to the first dielectric material 981 without being inserted into the first dielectric material 981, by forming at least one of one surface of the first dielectric material 981 as a curved shape, it may be possible to secure a relatively higher antenna performance in a predetermined frequency band (e.g., about 24.25 to 27.5 GHz) compared to the case in which the first surface 981*a* of the first dielectric material 981 is formed only as a flat surface.

Figure 10:
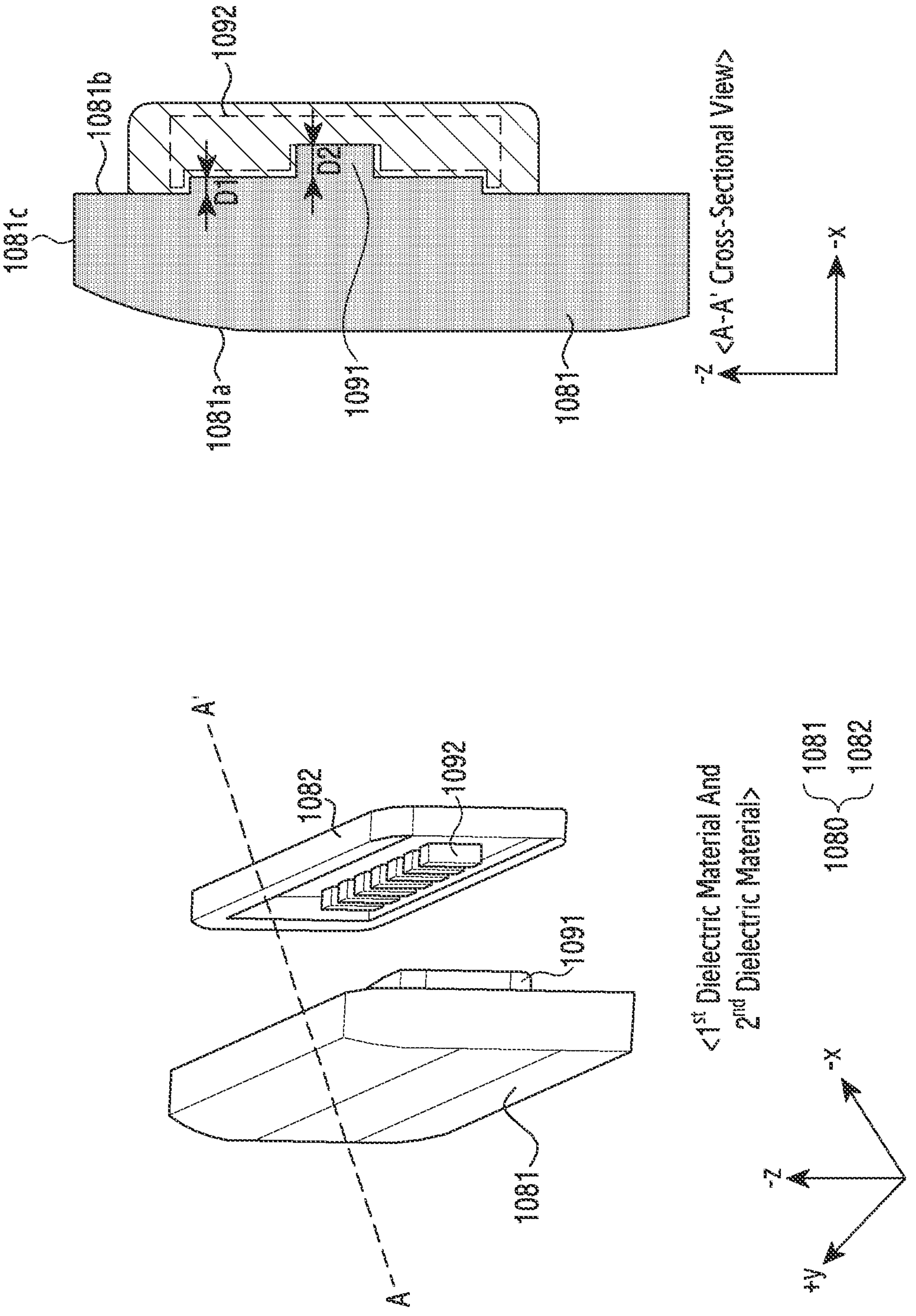
FIG. 10 is a view illustrating a perspective view and a cross-sectional view of a cover according to an embodiment of the disclosure.

FIG. 10 is a view illustrating a perspective view and a cross-sectional view of a cover according to an embodiment of the disclosure.

Referring to FIG. 10, the cover 1080 may include a first dielectric material 1081 and a second dielectric material 1082. The first dielectric material 1081 may be disposed in the first opening area 570 and form the first side surface 511 of the electronic device 101 together with the first frame 315*a*. The first dielectric constant of the first dielectric material 1081 according to an embodiment may be lower than the second dielectric constant of the second dielectric material 1082. The first dielectric material 1081 may include a protrusion 1091, and the second dielectric material 1082 may include an engagement groove 1092 corresponding to the protrusion 1091. As the protrusion 1091 of the first dielectric material 1081 is engaged with the engagement groove 1092 of the second dielectric material 1082, the first dielectric material 1081 and the second dielectric material 1082 may come into contact with each other. According to an embodiment of the disclosure, an adhesive member may be disposed between the first dielectric material 1081 and the second dielectric material 1082, and the first dielectric material 1081 and the second dielectric material 1082 may be bonded to each other.

Accordingly, unlike the cover 580 illustrated in FIG. 5D, in the cover 1080, in a state in which at least a portion of the first dielectric material 1081 is inserted (or entered in) into the second dielectric material 1082, the first dielectric material 1081 and the second dielectric material 1082 may be in contact with each other.

According to another embodiment of the disclosure, the first dielectric material 1081 and/or the second dielectric material 1082 may be bonded to each other without a separate adhesive member. For example, the second surface 1081*b* of the first dielectric material 1081 may be configured as an adhesive layer having an adhesive force, and the first dielectric material 1081 and the second dielectric material 1082 may be bonded to each other.

As the protrusion 1091 is inserted (or entered in) into the engagement groove 1092 for bonding the first dielectric material 1081 and the second dielectric material 1082 to each other, the first dielectric material 1081 may be bonded to the second dielectric material 1082 according to the engagement groove 1092 of the second dielectric material 1082. For example, the engagement groove 1092 may have a stair shape, and the first dielectric material 1081 and the second dielectric material 1082 may be bonded to each other along the stair-shaped engagement groove 1092.

The first dielectric material 1081 may include a first surface 1081*a* facing the exterior of the electronic device 101, a second surface 1081*b* that is in contact with the second dielectric material 1082 in at least one area, and a third surface 1081*c* between the first 'surface 1081*a* and the second surface 1081*b*. At least one area of the first surface 1081*a* may be formed as a curved surface.

The engagement groove 1092 of the second dielectric material 1082 may be formed as a stair shape. For example, the engagement groove 1092 may include a first portion having a first depth D1 and a second portion having a second depth D2. In an embodiment, the stair shape may mean a shape having a predetermined level difference (e.g., a first depth D1 and a second depth D2).

Figure 11:
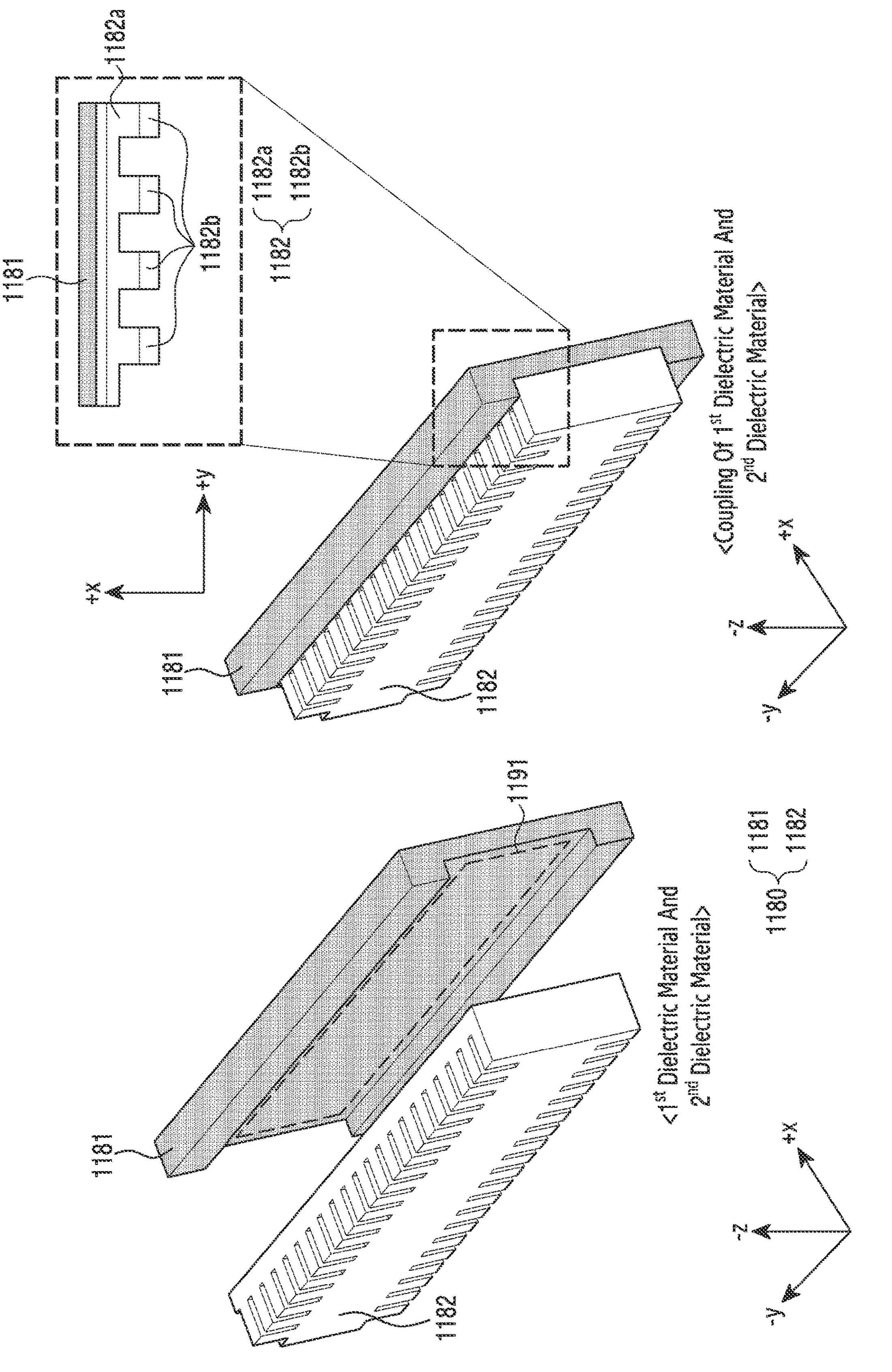
FIG. 11 is a view illustrating a perspective view and a cross-sectional view of a cover according to an embodiment of the disclosure.

FIG. 11 is a view illustrating a perspective view and a cross-sectional view of a cover according to an embodiment of the disclosure.

Referring to FIG. 11, the cover 1180 may include a first dielectric material 1181 and a second dielectric material 1182. The first dielectric material 1181 may be disposed in the first opening area 570 and form the first side surface 511 of the electronic device 101 together with the first frame 315*a*. The first dielectric material 1181 may include an engagement groove 1191 to be engaged with the second dielectric material 1182, and as at least a portion of the second dielectric material 1182 is inserted (or entered in) into the engagement groove 1191, the first dielectric material 1181 and the second dielectric material 1182 may come into contact with each other. The engagement groove 1191 may be formed as, for example, a rectangular shape, and the second dielectric material 1182 may be formed as a shape corresponding to the engagement groove 1191.

According to an embodiment of the disclosure, an adhesive member may be disposed between the engagement groove 1191 of the first dielectric material 1181 and the second dielectric material 1182, and the first dielectric material 1181 and the second dielectric material 1182 may be bonded to each other via the adhesive member.

According to an embodiment, the second dielectric material 1182 may include a first portion 1182*a* and a second portion 1182*b* protruding from the first portion 1182*a* in a first direction (e.g., the −x direction).

Figure 12:
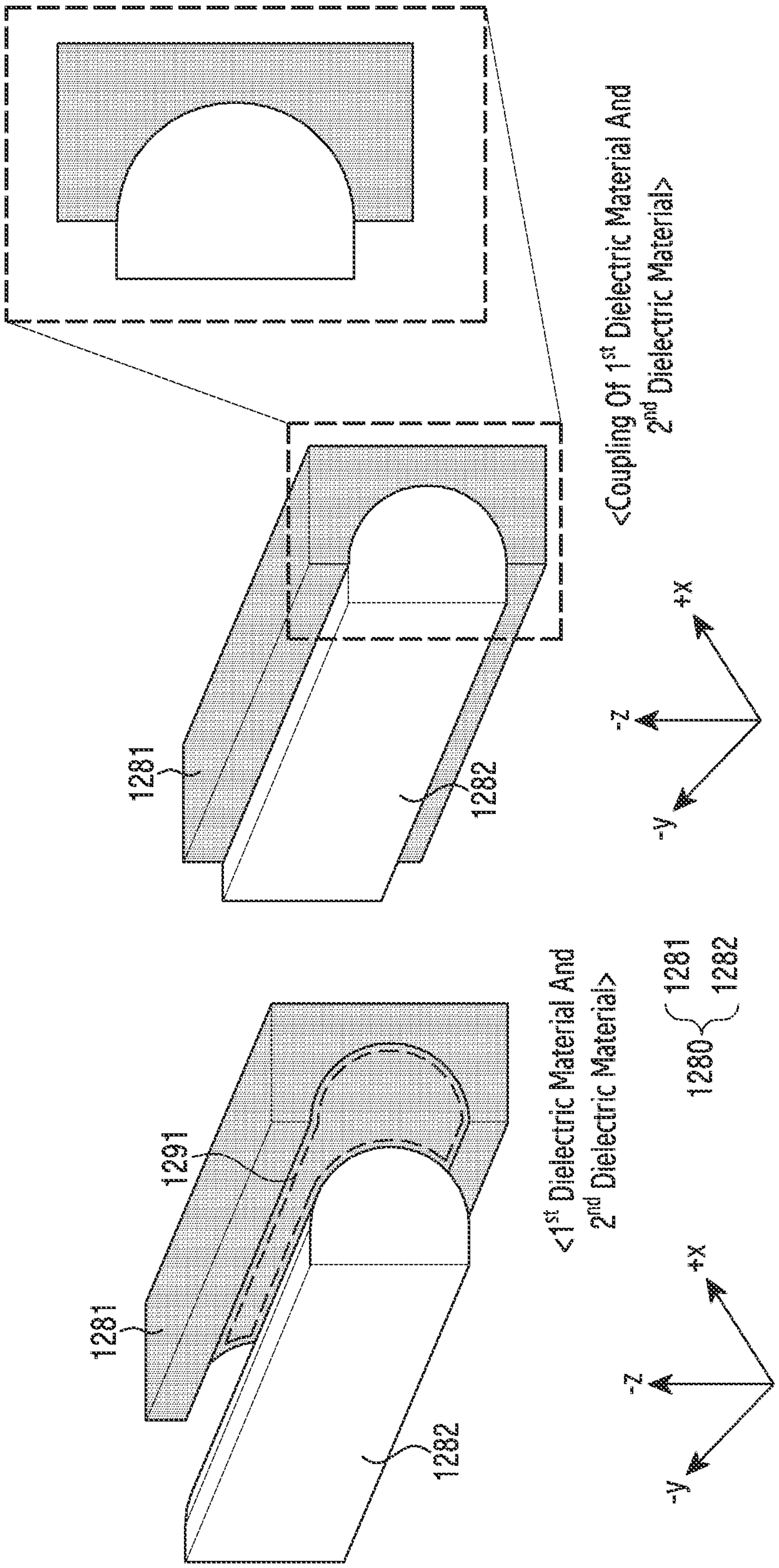
FIG. 12 is a view illustrating a perspective view and a cross-sectional view of a cover according to an embodiment of the disclosure.

FIG. 12 is a view illustrating a perspective view and a cross-sectional view of a cover according to an embodiment of the disclosure.

Referring to FIG. 12, the cover 1280 may include a first dielectric material 1281 and a second dielectric material 1282. The first dielectric material 1281 may be disposed in the first opening area 570 and form the first side surface 511 of the electronic device 101 together with the first frame 315*a*. The first dielectric material 1281 may include an engagement groove 1291 to be engaged with the second dielectric material 1282, and as at least a portion of the second dielectric material 1282 is inserted (or entered in) into the engagement groove 1291, the first dielectric material 1281 and the second dielectric material 1282 may come into contact with each other. The second dielectric material 1282 may be formed such a cross section taken along the first axis (e.g., the x-axis) has a semicircular shape. The engagement groove 1291 may be formed as a shape corresponding to the shape of the second dielectric material 1282.

According to another embodiment, the second dielectric material 1282 may be formed as a circular or polygonal column shape such that the cross section taken along the first axis (e.g., the x-axis) has a sector shape, and the engagement groove of the first dielectric material 1281 may be formed as a shape corresponding to the shape of the second dielectric material 1282.

According to an embodiment of the disclosure, an adhesive member may be disposed between the engagement groove 1291 of the first dielectric material 1281 and the second dielectric material 1282, and the first dielectric material 1281 and the second dielectric material may be bonded to each other via the adhesive member 1282.

Figure 13:
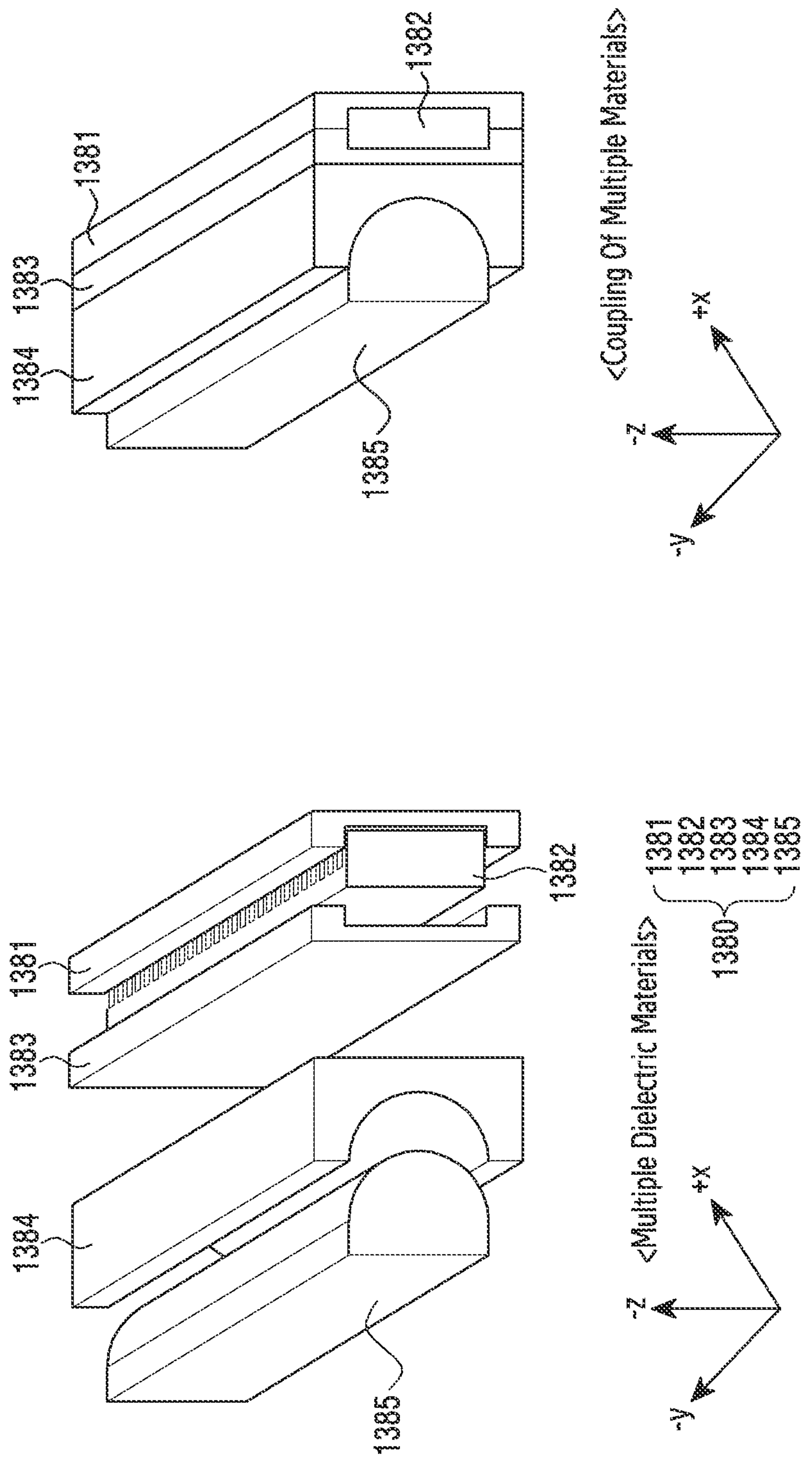
FIG. 13 is a view illustrating a perspective view and a cross-sectional view of a cover according to an embodiment of the disclosure.

FIG. 13 is a view illustrating a perspective view and a cross-sectional view of a cover according to an embodiment of the disclosure.

Referring to FIG. 13, a cover 1380 may include a first dielectric material 1381, a second dielectric material 1382, a third dielectric material 1383, a fourth dielectric material 1384, and a fifth dielectric material 1385. The first dielectric material 1381 may be disposed in the first opening area 570 and form the first side surface 511 of the electronic device 101 together with the first frame 315*a*.

The first dielectric material 1381 and the second dielectric material 1382 may correspond to the first dielectric material 1181 and the second dielectric material 1182 illustrated in FIG. 11. However, compared to the embodiment illustrated in FIG. 11, the cover 1380 according to the embodiment illustrated in FIG. 13 may further include a third dielectric material 1383 coupled to the second dielectric material 1382.

The fourth dielectric material 1384 and the fifth dielectric material 1385 may correspond to the first dielectric material 1281 and the second dielectric material 1282 illustrated in FIG. 12.

Accordingly, the cover 1380 illustrated in FIG. 13 may be configured by coupling the cover 1180 illustrated in FIG. 11, the cover 1280 illustrated in FIG. 12, and the third dielectric material 1382.

According to various embodiments of the disclosure, an electronic device 101 may include a first frame 315*a*, a first opening 571 provided in a first area of the first frame 315*a*, a first antenna module 346 disposed inside the electronic device 101 to wirelessly radiate a signal toward the first opening 571 in the first frame 315*a*, a cover 580 including a first dielectric material 581 forming the first side surface 511 of the electronic device 101 together with the first frame 315*a* and a second dielectric material 582 disposed between the first dielectric material 581 and the first antenna module 346, wherein the cover 580 is disposed in the first area of the first frame 315*a*, and a first wireless communication circuit 452 electrically connected to the first antenna module 346. The first dielectric material 581 may include an engagement groove 591, the second dielectric material 582 may include a protrusion 592 corresponding to the engagement groove 591 of the first dielectric 581, and the first dielectric 581 and the second dielectric 582 may come into contact with each other as the protrusion 592 of the second dielectric 582 is engaged with the engagement groove 591 of the first dielectric 581. The first frame 315*a* may form a portion of the first side surface 511 of the electronic device 101, the first antenna module 346 may include a first printed circuit board 410, and first conductive patches 330 disposed on one surface of the first printed circuit board 410 facing the first opening 571, and the first wireless communication circuit 452 may receive a signal in a frequency band of 10 GHz or higher by feeding power to the first conductive patches 330.

According to an embodiment, the first dielectric material 881 may include a first surface 881*a* that faces the exterior of the electronic device 101 and includes a curved surface provided in at least one area, and a second surface 881*b* that is in contact with the second dielectric material 882 in at least one area, wherein the first surface 881*a* and the second surface 881*b* may meet at a first edge of the first dielectric material 881.

According to an embodiment, the first dielectric material 581 may include a first surface 581*a* that faces the exterior of the electronic device 101 and a curved surface provided in at least one area, a second surface 581*b* that is in contact with the second dielectric material 582 in at least one area, and a third surface 581*c* between the first surface 581*a* and the second surface 581*b*.

According to an embodiment, the signal in the frequency band of 10 GHz or higher that is received by the first wireless communication circuit 452 may pass through the first dielectric material 581 and the second dielectric material 582.

According to an embodiment, a first dielectric constant of the first dielectric material 581 may be lower than a second dielectric constant of the second dielectric material 582.

According to an embodiment, the first dielectric constant of the first dielectric material 581 may have a value between 2 and 4.

According to an embodiment, the second dielectric constant of the second dielectric material 582 may have a value between 5.5 and 12.

According to an embodiment, the first opening 571 may include a first edge 571*a* and a second edge 571*b* perpendicular to the first edge 571*a*, wherein the first edge 571*a* may have a first length, and the second edge 571*b* may have a second length longer than the first length.

According to an embodiment, the signal in the frequency band of 10 GHz or higher that is received by the first wireless communication circuit 452 may include a first signal having a first polarization characteristic in a first direction and a second signal having a second polarization characteristic in a second direction.

According to an embodiment, the first direction may be parallel to the first edge 571*a* of the first opening 571, and the first length of the first edge 571*a* of the first opening 571 may be shorter than a ½ wavelength of a wavelength of the first signal.

According to an embodiment, when viewed from the exterior of the electronic device 101, the first opening 571 may be covered by the cover 580 disposed in the first area of the first frame 315*a*.

The electronic device 101 according to an embodiment may further include an adhesive member disposed between the first dielectric material 581 and the second dielectric material 582, and the first dielectric material 581 and the second dielectric material 582 may be bonded to each other via the adhesive member.

According to an embodiment, the second dielectric material 582 may be disposed in the first opening 571.

According to an embodiment, the first conductive patches 330 may include a first conductive patch 332, a second conductive patch 334, a third conductive patch 336, a fourth conductive patch 338, and a fifth conductive patch 340, and the first conductive patches 340 may form a 1×5 antenna array.

According to an embodiment, the at least one opening provided in the first area of the first frame 315*a* may include a plurality of openings 571, 572, 573, 574, and 575, and the plurality of openings 571, 572, 573, 574, and 575 may be in one-to-one correspond the first conductive patches 330 of the first antenna module 346, respectively.

An electronic device 101 according to various embodiments of the disclosure may include a first frame 315*a*, a first opening 571 provided in a first area of the first frame 315*a*, a first antenna module 346 disposed inside the electronic device 101 to wirelessly radiate a signal toward the first opening 571 in the first frame 315*a*, a cover 1080 including a first dielectric material 1081 forming the first side surface 511 of the electronic device 101 together with the first frame 315*a* and a second dielectric material 1082 disposed between the first dielectric material 1081 and the first antenna module 346, wherein the cover 580 is located in the first area of the first frame 315*a*, and a first wireless communication circuit 452 that is electrically connected to the antenna module. The first frame 315*a* may form a portion of the first side surface 511 of the electronic device 101, and the first antenna module 346 may include a first printed circuit board 410 and may include first conductive patches 330 that are disposed on one surface of the first printed circuit board 410 that faces the first opening 571. The first dielectric material 1081 may include a protrusion 1091, the second dielectric material 1082 may include an engagement groove 1092 corresponding to the protrusion 1091 of the first dielectric 1081, and the first dielectric material 1081 and the second dielectric material 1082 may come into contact with each other as the protrusion 1091 of the first dielectric material 1081 is engaged with the engagement groove 1092 of the second dielectric material 1082. The first wireless communication circuit 452 may receive a signal in a frequency band of 10 GHz or higher by feeding power to the first conductive patches 330.

According to an embodiment, the first dielectric material 881 may include a first surface 881*a* that faces the exterior of the electronic device 101 and includes a curved surface provided in at least one area, and a second surface 881*b* that is in contact with the second dielectric material 882 in at least one area, wherein the first surface 881*a* and the second surface 881*b* may meet at a first edge of the first dielectric material 881.

According to an embodiment, the first dielectric material 1081 may include a first surface 1081*a* that faces the exterior of the electronic device 101 and a curved surface provided in at least one area, a second surface 1081*b* that is in contact with the second dielectric material 1082 in at least one area, and a third surface 1081*c* between the first surface 1081*a* and the second surface 1081*b*.

According to an embodiment, the signal in the frequency band of 10 GHz or higher that is received by the first wireless communication circuit 452 may pass through the first dielectric material 1081 and the second dielectric material 1082.

According to an embodiment, a first dielectric constant of the first dielectric material 1081 may be lower than a second dielectric constant of the second dielectric material 1082.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first frame forming a portion of a first side surface of the electronic device;
at least one opening formed in a first area of the first frame;
an antenna module that is disposed in the electronic device to wirelessly radiate a signal toward the at least one opening of the first frame, wherein the antenna module includes a printed circuit board and conductive patches disposed on one surface of the printed circuit board that faces the at least one opening;
a cover disposed in the at least one opening of the first frame, wherein the cover includes:
a first dielectric material forming the first side surface, and including an engagement groove, and
a second dielectric material disposed between the first dielectric material and the antenna module, and including a protrusion corresponding to the engagement groove of the first dielectric material,
wherein the first dielectric material and the second dielectric material come into contact as the protrusion of the second dielectric material is engaged with the engagement groove of the first dielectric material; and
a wireless communication circuit electrically connected to the antenna module,
wherein the wireless communication circuit is configured to feed power to the conductive patches to transmit and/or receive a signal in a frequency band of 10 gigahertz (GHz) or higher.

2. The electronic device of claim 1,
wherein the first dielectric material includes:
a first surface facing exterior of the electronic device and having at least one area formed as a curved surface, and
a second surface that is in contact with the second dielectric material in at least one area, and
wherein the first surface and the second surface meet at a first edge of the first dielectric material.

3. The electronic device of claim 1,
wherein the first dielectric material includes:
a first surface that faces exterior of the electronic device and is formed as a curved surface in at least one area,
a second surface that is in contact with the second dielectric material in at least one area, and
a third surface between the first surface and the second surface.

4. The electronic device of claim 1, wherein the signal having the frequency band of 10 GHz or higher received by the wireless communication circuit passes through the first dielectric material and the second dielectric material.

5. The electronic device of claim 1, wherein a first dielectric constant of the first dielectric material is lower than a second dielectric constant of the second dielectric material.

6. The electronic device of claim 1, wherein a first dielectric constant of the first dielectric material has a value between 2 and 4.

7. The electronic device of claim 1, wherein a second dielectric constant of the second dielectric material has a value between 5.5 and 12.

8. The electronic device of claim 1,
wherein the at least one opening includes a first opening,
wherein the first opening includes a first edge and a second edge perpendicular to the first edge, and
wherein the first edge has a first length, and the second edge has a second length greater than the first length.

9. The electronic device of claim 8, wherein the signal in the frequency band of 10 GHz or higher that is received by the wireless communication circuit includes a first signal having a first polarization characteristic in a first direction and a second signal having a second polarization characteristic in a second direction.

10. The electronic device of claim 9, wherein the first direction is parallel to the first edge of the first opening, and wherein the first length of the first edge of the first opening is smaller than a ½ wavelength of a wavelength of the first signal.

11. The electronic device of claim 1, wherein, when viewed from exterior of the electronic device, the at least one opening is covered by the cover disposed in the first area of the first frame.

12. The electronic device of claim 1, further comprising:

an adhesive member disposed between the first dielectric material and the second dielectric material, wherein the first dielectric material and the second dielectric material are bonded to each other via the adhesive member.

13. The electronic device of claim 1, wherein the second dielectric material is disposed in the at least one opening.

14. The electronic device of claim 1, wherein the conductive patches include a first conductive patch, a second conductive patch, a third conductive patch, a fourth conductive patch, and a fifth conductive patch, and wherein the conductive patches configures a 1×5 antenna array.

15. The electronic device of claim 1, wherein the at least one opening provided in the first area of the first frame includes a plurality of openings, and wherein the plurality of openings are in one-to-one correspondence to the conductive patches of the antenna module, respectively.

16. An electronic device comprising:

a first frame forming a portion of a first side surface of the electronic device;

at least one opening formed in a first area of the first frame;

an antenna module disposed in the electronic device to wirelessly radiate a signal toward the at least one opening of the first frame, wherein the antenna module includes a printed circuit board and conductive patches disposed on one surface of the printed circuit board that faces the at least one opening;

a cover that is disposed in the first area of the first frame, wherein the cover includes:

a first dielectric material forming the first side surface of the electronic device together with the first frame, and including a protrusion, and a second dielectric material that is located between the first dielectric material and the antenna module, and including an engagement groove corresponding to the protrusion of the first dielectric material, wherein the first dielectric material and the second dielectric material are in contact as the protrusion of the first dielectric material is coupled to the engagement groove of the second dielectric material; and a wireless communication circuit electrically connected to the antenna module, wherein the wireless communication circuit is configured to feed power to the conductive patches to transmit and/or receive a signal in a frequency band of 10 gigahertz (GHz) or higher.

17. The electronic device of claim 16, wherein the first dielectric material includes:

a first surface facing exterior of the electronic device and having at least one area formed as a curved surface, and a second surface in contact with the second dielectric material in at least one area, and wherein the first surface and the second surfaces meet at a first edge of the first dielectric material.

18. The electronic device of claim 16, wherein the first dielectric material includes:

a first surface that faces exterior of the electronic device and is provided in a curved surface in at least one area, and a second surface that is in contact with the second dielectric material in at least one area, and wherein a third surface between the first surface and the second surface.

19. The electronic device of claim 16, wherein the signal in the frequency band of 10 GHz or higher that is received by the wireless communication circuit passes through the first dielectric material and the second dielectric material.

20. The electronic device of claim 16, wherein a first dielectric constant of the first dielectric material is lower than a second dielectric constant of the second dielectric material.

* * * * *